（12） United States Patent
Asakura

(10) Patent No.: US 10,237,536 B2
(45) Date of Patent: Mar. 19, 2019

(54) IMAGE PROCESSING APPARATUS AND STORAGE MEDIUM FOR DEFORMING OR MOVING DISPLAYED OBJECTS

(71) Applicant: NINTENDO CO., LTD., Kyoto (JP)

(72) Inventor: Atsushi Asakura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 40 days.

(21) Appl. No.: 15/477,526

(22) Filed: Apr. 3, 2017

(65) Prior Publication Data

US 2017/0294047 A1 Oct. 12, 2017

(30) Foreign Application Priority Data

Apr. 8, 2016 (JP) .................. 2016-077781

(51) Int. Cl.

| | |
|---|---|
| *A63F 13/5258* | (2014.01) |
| *G06F 3/01* | (2006.01) |
| *G06K 9/00* | (2006.01) |
| *G06T 15/20* | (2011.01) |
| *G06T 19/00* | (2011.01) |
| *H04N 13/279* | (2018.01) |
| *G06F 3/0481* | (2013.01) |
| *A63F 13/57* | (2014.01) |

(52) U.S. Cl.
CPC ....... *H04N 13/279* (2018.05); *A63F 13/5258* (2014.09); *A63F 13/57* (2014.09); *G06F 3/011* (2013.01); *G06F 3/04815* (2013.01); *G06T 19/00* (2013.01)

(58) Field of Classification Search
CPC ... H04N 13/279; A63F 13/5258; A63F 13/57; G06F 3/01; G06F 3/011; G06F 3/04815; G06T 19/00
USPC .......................................... 345/633
See application file for complete search history.

(56) References Cited

U.S. PATENT DOCUMENTS

| | | | |
|---|---|---|---|
| 8,882,593 B2 | 11/2014 | Yamashita | |
| 2012/0146992 A1* | 6/2012 | Maeta | G06F 3/04815 345/419 |
| 2013/0265217 A1* | 10/2013 | Sakaguchi | G06F 3/01 345/156 |

FOREIGN PATENT DOCUMENTS

JP 2013097473 5/2013

* cited by examiner

*Primary Examiner* — Jin Cheng Wang
(74) *Attorney, Agent, or Firm* — Nixon & Vanderhye P.C.

(57) ABSTRACT

A non-limiting example game system includes a game apparatus, and a terminal device and a television are connected to the game apparatus. A game image that is displayed on the television is an image that various kinds of objects arranged in a virtual space are imaged by a virtual camera. The virtual camera follows a player object so as to keep a predetermined distance with the player object, and when the player object enters a grassland object with comparatively long length, for example, each grass object is deformed or moved so as to go away from the virtual camera. For example, a height of the grass object near the virtual camera is made comparatively low, and the height is gradually made high as it separates from the virtual camera.

21 Claims, 19 Drawing Sheets

WHEN INCLINING

WHEN MOVING

FIG. 16(A)
WHEN VIEWING DIRECTION OF VISUAL LINE OF VIRTUAL CAMERA
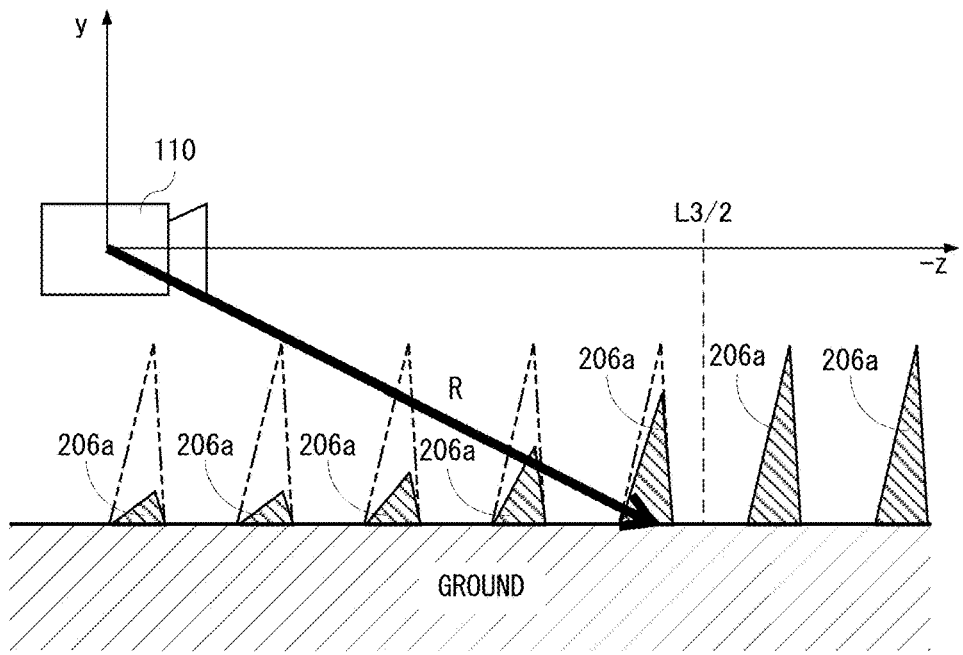
FIG. 16(B)  RANGE CHANGING HEIGHT H
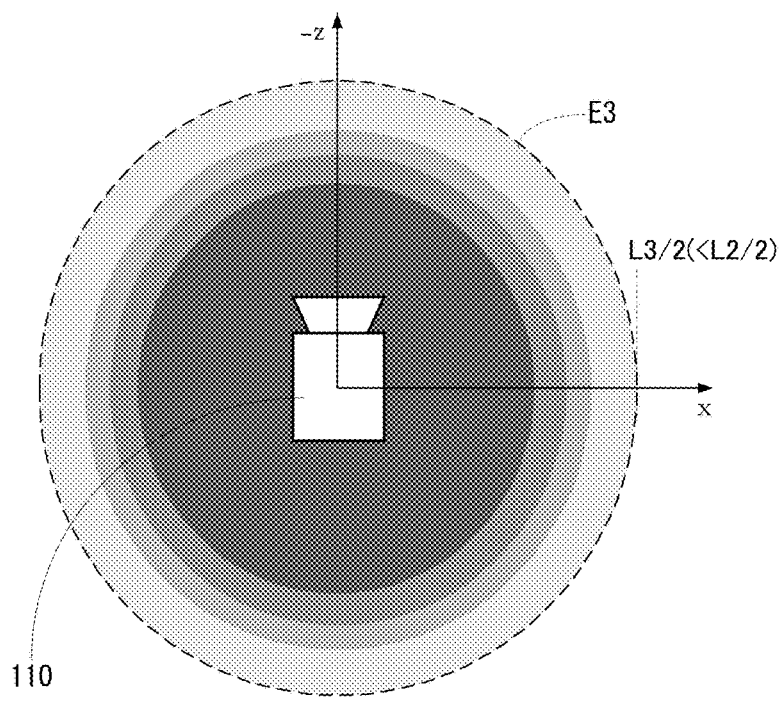

IMAGE PROCESSING APPARATUS AND STORAGE MEDIUM FOR DEFORMING OR MOVING DISPLAYED OBJECTS

CROSS REFERENCE OF RELATED APPLICATION

The disclosure of Japanese patent application No. 2016-077781 filed on Apr. 8, 2016 is incorporated by reference.

FIELD

This application describes an image processing apparatus that produces an image displayed on a display, and a storage medium.

SUMMARY

A primary object of an embodiment(s) is to provide a novel image processing apparatus and storage medium.

In addition, another object of the embodiment(s) is to provide an image processing apparatus and storage medium, capable of increasing visibility of an image while maintaining an appearance as natural as possible.

A first embodiment is an image processing apparatus, comprising: an object controlling portion, a virtual camera controlling portion, and an image producing portion. The object controlling portion controls objects arranged in a virtual space. The virtual camera controlling portion controls a virtual camera that is movably arranged in the virtual space. An image producing portion produces an image of the virtual space based on the virtual camera. The object controlling portion further performs first object control processing that deforms or moves a plurality of first kind objects out of the objects arranged in the virtual space in accordance with a distance from the virtual camera so as to go away from the virtual camera.

According to the first embodiment, since the plurality of first kind objects are deformed or moved in accordance with the distance from the virtual camera so as to go away from the virtual camera, the plurality of first kind objects are less likely to be obstructive in the image viewed from the virtual camera. In addition, since the processing of transforming or moving the first kind objects is performed, an appearance of the image viewed from the virtual camera is comparatively natural as compared with a case of performing processing that makes an object transparent. That is, it is possible to increase visibility of the image while maintaining the appearance as natural as possible.

A second embodiment is the image processing apparatus according to the first embodiment, further comprises an operation receiving portion. The operation receiving portion receives an operation input by a user. The virtual camera controlling portion moves the virtual camera in the virtual space according to the operation input by the user.

According to the second embodiment, even if the user moves the virtual camera, it is possible to increase the visibility with natural appearance as described above.

A third embodiment is the image processing apparatus according to the second embodiment, wherein a second kind object that is controlled according to the operation input by the user is further included in the objects arranged in the virtual space. The object controlling portion further performs second object control processing that controls a position of the second kind object in the virtual space according to the operation input by the user. The virtual camera controlling portion performs control that makes the virtual camera follow the second kind object so that the second kind object can enter into a field of view of the virtual camera.

According to the third embodiment, since the plurality of first kind objects are deformed or moved so as to go away from the virtual camera in accordance with the distance from the virtual camera, it is possible to increase the visibility of the second kind object even if the virtual camera is caused to follow the second kind object so that the second kind object that the user can control its movement can be included in a visual field of the virtual camera.

A fourth embodiment is the image processing apparatus according to the first embodiment, wherein the object controlling portion performs deformation or movement in first object control processing so that the larger distance of the first kind object out of the plurality of the first kind objects to the virtual camera in the same direction, the smaller degree of the deformation or movement. That is, the deformation or movement of the first kind object for keeping away from the virtual camera is gradually made small.

According to the fourth embodiment, since the degree of the deformation or movement is gradually made small, it is possible to make the image after deformation or movement appears more natural.

A fifth embodiment is an image processing apparatus, comprising: an operation receiving portion, an object controlling portion, a virtual camera controlling portion, and an image producing portion. The operation receiving portion receives an operation input by a user. The object controlling portion controls objects arranged in a virtual space. The virtual camera controlling portion controls a virtual camera that is movably arranged in the virtual space. The image producing portion produces an image of the virtual space based on the virtual camera. A plurality of first kind objects and a second kind object that is controlled in accordance with the operation input by the user are included in the objects arranged in the virtual space. The object controlling portion determines, based on the virtual camera, whether at least a part of the second kind object is hindered by the first kind objects, and in a case of a hindering state, performs first object control processing that deforms or moves the first kind objects so that the first kind objects go away from the virtual camera.

According to the fifth embodiment, it is possible to increase visibility of the image with natural appearance like the first embodiment. Moreover, according to the fifth embodiment, it is possible to perform the first object control processing if needed.

A sixth embodiment is the image processing apparatus according to the first embodiment, wherein a third kind object is further included in the objects arranged in the virtual space as a ground. The first kind object is an object of a vertically-long shape arranged on the third kind object. The deformation is decreasing a length from an upper surface of the third kind object to an upper end of the first kind object, or a height from the upper surface of the third kind object to the upper end of the first kind object.

According to the sixth embodiment, since the length or height of the first kind object arranged on the third kind object as the ground is decreased, if the length or height of the first kind object is decreased between the virtual camera and its imaging target, it is possible to increase visibility of the imaging target. In addition, since only the length or height of the first kind object is decreased, it is possible to maintain visual naturalness of the image as much as possible.

A seventh embodiment is a non-transitory computer readable storage medium storing a game program that is executed by a computer, wherein the game program causes one or more processors provided in the computer to perform an object controlling step, a virtual camera controlling step, and an image producing step. The object controlling step controls objects arranged in a virtual space. The virtual camera controlling step controls a virtual camera that is movably arranged in the virtual space. The image producing step produces an image of the virtual space based on the virtual camera. The object controlling step further performs first object control processing that deforms or moves a plurality of first kind objects out of the objects arranged in the virtual space in accordance with a distance from the virtual camera so as to go away from the virtual camera.

An eighth embodiment is a non-transitory computer readable storage medium storing a game program that is executed by a computer, wherein the game program causes one or more processors provided in the computer to perform an operation receiving step, an object controlling step, a virtual camera controlling step, and an image producing step. The operation receiving step receives an operation input by a user. The object controlling step controls objects arranged in a virtual space. The virtual camera controlling step controls a virtual camera that is movably arranged in the virtual space. The image producing step produces an image of the virtual space based on the virtual camera. A plurality of first kind objects and a second kind object that is controlled in accordance with the operation input by the user are included in the objects arranged in the virtual space. The object controlling step determines whether, based on the virtual camera, at least a part of the second kind object is hindered by the first kind object, and in a case of a hindering state, performs first object control processing that deforms or moves the first kind objects so that the first kind objects go away from the virtual camera.

Like the first embodiment, in the seventh or eighth embodiment, it is also possible to increase the visibility of the image with natural appearance.

In addition, like the fifth embodiment, according to the eighth embodiment, it is also possible to perform the first object control processing if needed.

The above described objects and other objects, features, aspects and advantages of the embodiments will become more apparent from the following detailed description when taken in conjunction with the accompanying drawings.

BRIEF DESCRIPTION OF THE DRAWINGS

FIG. 16(A) is an illustration view showing a non-limiting example method of controlling further vertically-long object so as to go away from a virtual camera, and FIG. 16(B) is an illustration view showing non-limiting example parameter that is set in order to change the height of the further vertically-long object when explaining using FIG. 16(A).

DETAILED DESCRIPTION OF NON-LIMITING EXAMPLE EMBODIMENTS

Figure 1:
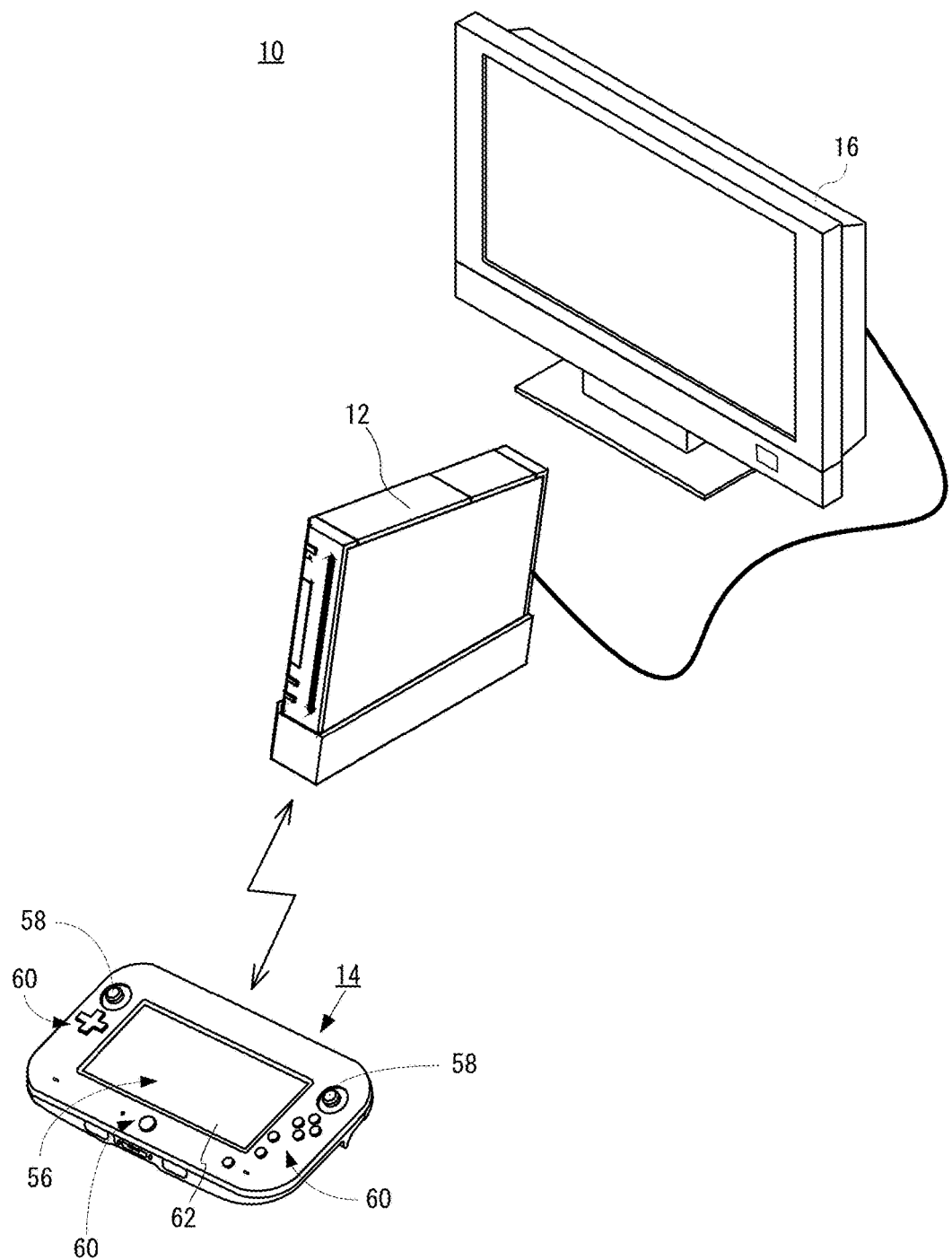
FIG. 1 is an appearance view of a non-limiting example game system.

In the following, a non-limiting example game system 10 according to an embodiment with reference to drawings. The game system 10 shown in FIG. 1 includes a stationary game apparatus 12 and a portable terminal device 14. Moreover, the game system 10 includes a stationary display device 16 typified by a television receiver or the like (hereinafter, referred to as "television"), and a game apparatus 12 and the television 16 are connected to each other via a connection cord. The game system 10 performs game processing in the game apparatus 12 based on a game operation using the terminal device 14, and displays a game image obtained by the game processing on the television 16 and/or the terminal device 14.

Although illustration is omitted, an optical disk is detachably inserted into the game apparatus 12, which is an example of an information storage medium that is used interchangeably for the game apparatus 12 concerned. An information processing program (an application program typically like a game program) to be executed in the game apparatus 12 is stored in the optical disk. The game apparatus 12 performs information processing (game processing) by reading and executing the information processing program recorded in the optical disk.

The television 16 displays a game image obtained by the game processing performed in the game apparatus 12. The television 16 has a speaker 16a (FIG. 2), and the speaker 16a outputs a game sound obtained as a result of the above-described game processing.

In addition, in another embodiment, the game apparatus 12 and the stationary display may be integrated with each other. Moreover, communication between the game apparatus 12 and the television 16 may be wireless communication.

The terminal device 14 transmits or receives data to or from the game apparatus 12 at least. A user (player) can use the terminal device 14 while moving the terminal device 14 with his/her hand, or arranging the terminal device 14 at a free position. The terminal device 14 comprises an input portion such as a touch panel 56, an analog stick 58 and an operation button 60, and a display portion such as an LCD 62. It is possible to perform communication with the game apparatus 12 by wireless communications using technology of Bluetooth (registered trademark), for example. However, the terminal device 14 and the game apparatus 12 may be connected with each other by a cable. The terminal device 14 receives from the game apparatus 12 data of an image (game image, for example) that is produced in the game apparatus 12, and displays the received image on the LCD 62. Moreover, the terminal device 14 transmits operation data representing content of an operation that is performed on it own machine to the game apparatus 12.

Figure 2:
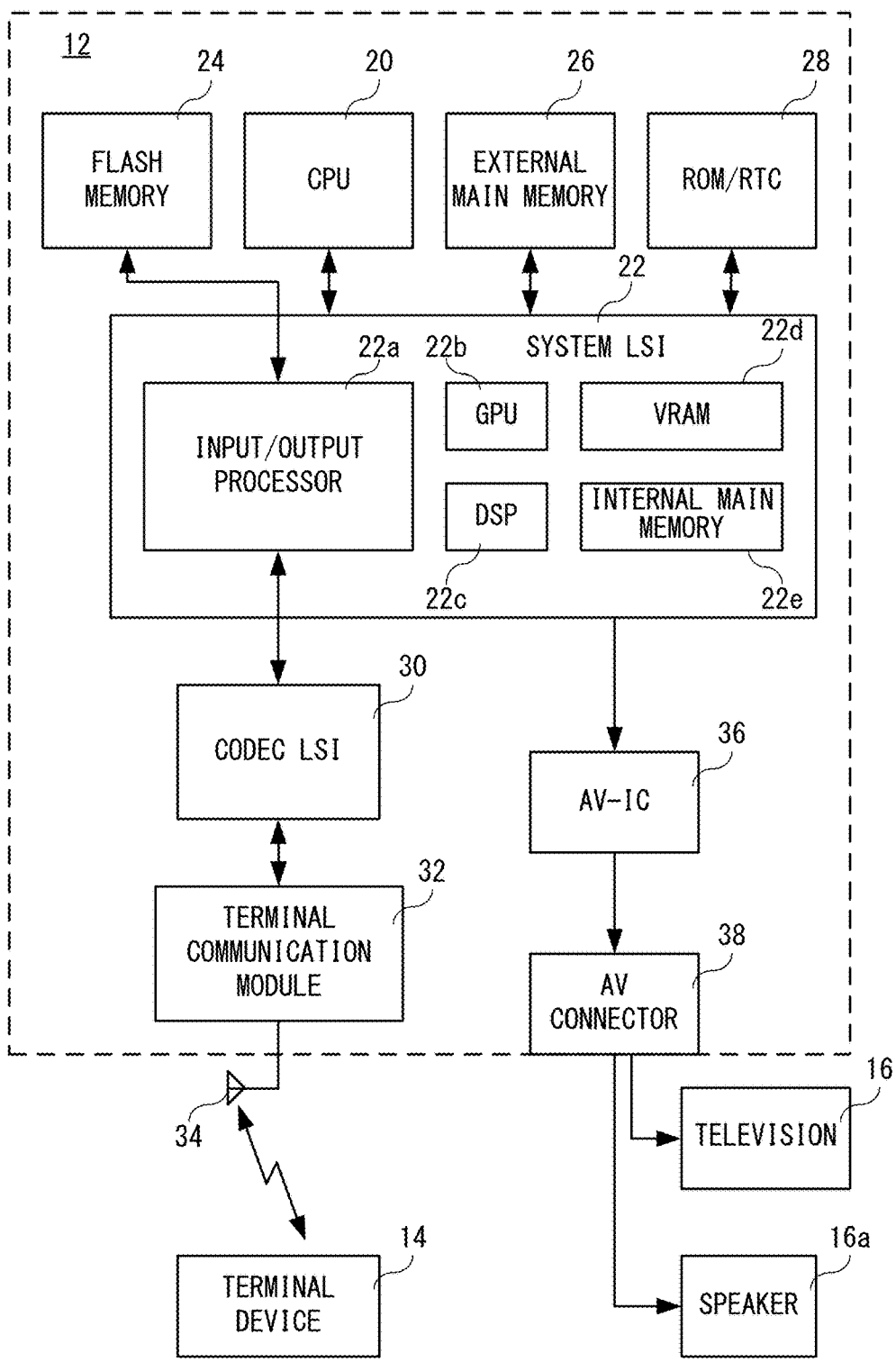
FIG. 2 is a block diagram showing non-limiting example electric structure of a game apparatus shown in FIG. 1.

FIG. 2 is a block diagram showing non-limiting example electric structure of the game apparatus 12. The game apparatus 12 has a CPU 20, a system LSI 22, an external main memory 26, a ROM/RTC 28, an AV-IC 36, etc.

By executing the game program recorded in the optical disk, the CPU 20 performs the game processing, and functions as a game processor. The CPU 20 is connected to the system LSI 22. The external main memory 26, the ROM/RTC 28 and the AV-IC 36 are connected to this system LSI 22 in addition to the CPU 20. The system LSI 22 performs processing such as control of data transfer between respective components connected to the system LSI 22, producing an image to be displayed, acquiring data from an external information processing apparatus, and so on.

A volatile external main memory 26 is a memory for storing a game program read from the optical disk, a game program read from the flash memory 24 and various kinds of data, and used as a working area and a buffer area for the CPU 20. The ROM/RTC 28 has a ROM (so called a boot ROM) in which a program for starting the game apparatus 12 is incorporated, and a clock circuit (RTC) for counting time.

In addition, the program data, texture data, etc. read from the optical disk are written in an internal main memory 22e described later or the external main memory 26.

An input/output processor (I/O processor) 22a, GPU 22b, DSP 22c, VRAM 22d and the internal main memory 22e are provided in the system LSI 22. Although illustration is omitted, these components 22a-22e are connected to each other by an internal bus.

The GPU 22b forms a part of a drawing portion, and produces image data according to a graphics command (drawing instruction) from the CPU 20. However, data such as polygon data, texture data, etc. read from the main memory (22e, 26) are stored in the VRAM 22d, and the GPU 22b produces image data using the data. In this embodiment, the game apparatus 12 produces image data of the game image to be displayed on the television 16 (hereinafter, called "game image for television").

The DSP 22c functions as an audio processor, and produces sound data using sound data and sound wave form (tone) data stored in the internal main memory 22e and the external main memory 26. In addition, in this embodiment, the game apparatus 12 produces sound data of the game sound to be output from the speaker 16a of the television 16 (hereinafter, called "game sound for television").

As described above, data of image and sound to be output on the television 16 (including sound effect, music, etc.) out of the images and sounds produced in the game apparatus 12 are read by the AV-IC 36. The AV-IC 36 outputs, via an AV connector 38, the read image data to the television 16, and the read sound data to the speaker 16a that is incorporated in the television 16, whereby an image is displayed on the television 16 and a sound or voice is output from the speaker 16a.

The input/output processor 22a performs transmission and reception of data with the components connected to the same, or performs download of data from external information processing apparatus. Moreover, the input/output processor 22a is connected to the flash memory 24 and a codec LSI 30. Furthermore, the codec LSI 30 is connected to a terminal communication module 32, and an antenna 34 is connected to the terminal communication module 32.

By executing the game program, the CPU 20 reads data stored in the flash memory 24 so as to utilize by the game program. The flash memory 24 may store with save data (result data or intermediate data) of the game that is played using the game apparatus 12 in addition to data transmitted or received between the game apparatus 12 and external information processing apparatus.

In addition, although illustration is omitted, the input/output processor 22a can be connected to a network such as the Internet with using a network communication module so as to communicate (transmit and receive data) with the external information processing apparatus (other game apparatuses, various servers, etc., for example) connected to the network.

Moreover, the game apparatus 12 can transmit and receive data to and from the terminal device 14. When transmitting data to the terminal device 14, the input/output processor 22a outputs the data to be transmitted to the codec LSI 30. The codec LSI 30 performs predetermined compression processing to the data that is sent from the input/output processor 22a. The terminal communication module 32 performs wireless communication with the terminal device 14. Therefore, data compressed by the codec LSI 30 is transmitted to the terminal device 14 by the terminal communication module 32 via the antenna 34. In this embodiment, the codec LSI 30 compresses data with using highly efficient compression technology such as H264 standard, for example.

Moreover, the game apparatus 12 can receive (accept) various kinds of data from the terminal device 14. In this embodiment, the terminal device 14 transmits operation data, image data and sound data. Each data transmitted from the terminal device 14 is received by the terminal communication module 32 via the antenna 34. Here, the image data and the sound data from the terminal device 14 are subject to the same compression processing as the data that is transmitted from the game apparatus 12 to the terminal device 14.

Therefore, the image data and the sound data are sent to the codec LSI 30 from the terminal communication module 32, and subjected to extension processing by the codec LSI 30 to be output to the input/output processor 22a.

On the other hand, because the operation data from the terminal device 14 is little data amount compared with the image data and the sound data, there is no need to subject the compression processing to the operation data. Moreover, the operation data may be or may not be encrypted as necessary. The operation data is output to the input/output processor 22a via the codec LSI 30 after the same is received by the terminal communication module 32. The input/output processor 22a stores (temporarily stores) the data that is received from the terminal device 14 into the buffer area of the internal main memory 22e or the external main memory 26.

In addition, there is no necessity that the structure of the game apparatus 12 is limited. For example, it is also possible to have structure capable of connecting with expansion devices.

Figure 3:
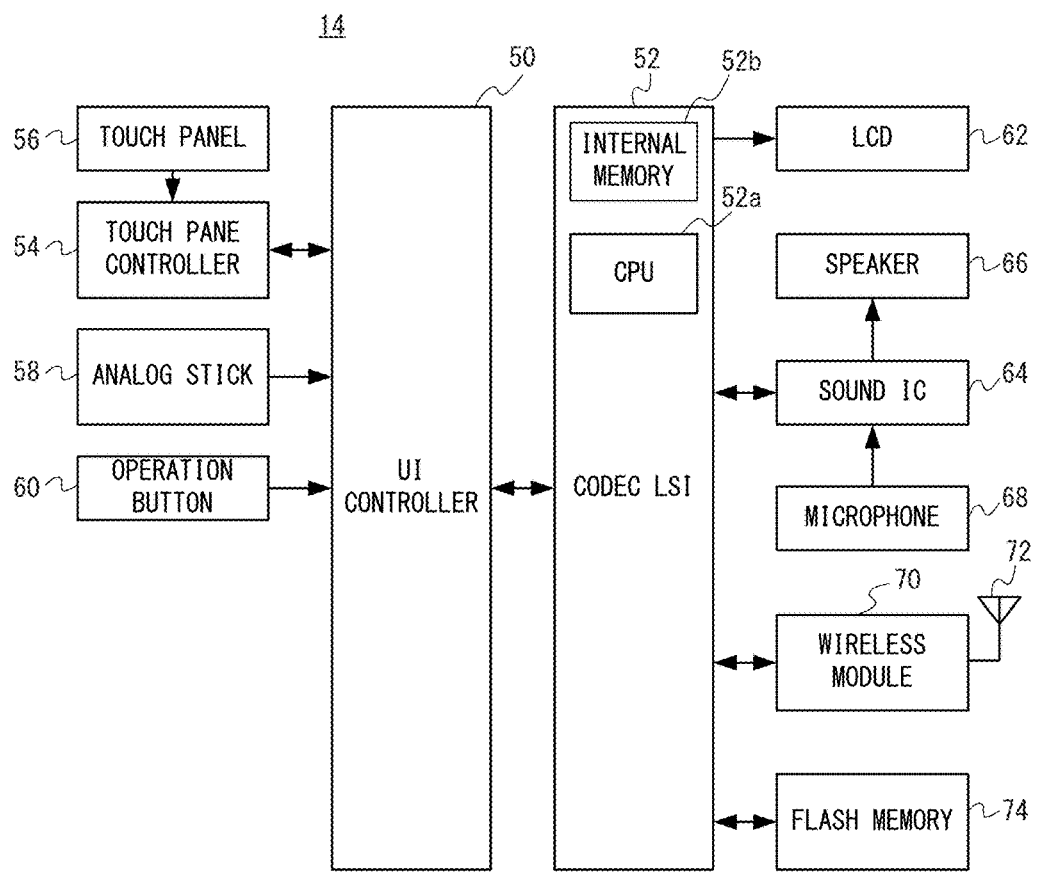
FIG. 3 is a block diagram showing non-limiting example electric structure of a terminal device shown in FIG. 1.

FIG. 3 is a block diagram showing non-limiting example electric structure of the terminal device 14. As shown in FIG. 3, the terminal device 14 comprises, in addition to the structure shown in FIG. 1, a user interface controller (UI controller) 50, a touch panel controller 54, a codec LSI 52, a speaker 66, a sound IC 64, a microphone 68, a wireless module 70, an antenna 72 and a flash memory 74. These electronic components are mounted on an electronic circuit board, and accommodated within a housing.

The UI controller 50 is a circuit for controlling inputs and outputs of data to various kinds of input-and-output portions. This UI controller 50 is connected to the touch panel controller 54, the analog stick 58 and the operation button 60. Moreover, the UI controller 50 is connected to the codec LSI 52.

The touch panel controller 54 is a circuit that is connected to the touch panel 56 to control the touch panel 56. The touch panel controller 54 produces touch position data of a predetermined format based on a signal from the touch panel 56, and outputs the touch position data to the UI controller 50. The touch position data represents coordinates of a position (touch position) at which an input is performed on an input face of the touch panel 56.

The analog stick 58 outputs to the UI controller 50 stick data representing a direction and amount that a stick portion operated by a finger of the user is slid (inclined). Moreover, the operation button 60 outputs to the UI controller 50 operation button data representing an input situation (depressed or not) to various kinds of operation buttons or key switches.

The UI controller 50 outputs to the codec LSI 52 operation data that includes the touch position data, the stick data and the operation button data received from the above-described respective components.

The codec LSI 52 is a circuit that performs compression processing to data to be transmitted to the game apparatus 12, and extension processing to data transmitted from the game apparatus 12. The LCD 62, the sound IC 64, the wireless module 70 and the flash memory 74 are connected to the codec LSI 52. Moreover, the codec LSI 52 includes a CPU 52a and an internal memory 52b.

The antenna 72 is connected to the wireless module 70, and the wireless module 70 transmits transmission data to the game apparatus 12 via the antenna 72. The wireless module 70 has the same function as the terminal communication module 32 of the game apparatus 12. As described above, the operation data, the image data and the sound data are included in the transmission data to be transmitted to the game apparatus 12 from the terminal device 14.

In addition, although the terminal device 14 of this embodiment is provided with an operation portions such as the touch panel 56, the analog stick 58 and the operation button 60, in another embodiment, it may be structure having another operation portion instead of these operation portions or together with these operation portions. For example, at least one of a magnetic sensor, an acceleration sensor and a gyro sensor may be provided as a sensor for calculating a motion (including a position and/or attitude or a change in position and/or attitude) of the terminal device 14.

Moreover, although the terminal device 14 is configured to have a camera and the microphone 68, in another embodiment, the terminal device 14 does not need to have the camera and the microphone 68, or may have one of them only.

The game apparatus 12 that is an example of information processing apparatus also functions also as an image processing apparatus, and produces and outputs (displays) image data. Briefly describing, the GPU 22b performs modeling of various kinds of objects in a three-dimensional virtual space under instructions of the CPU 20. That is, various kinds of objects are produced or arranged in the virtual space, whereby a certain sight (scene) can be produced. An image that this scene is imaged by the virtual camera (viewed from a viewpoint) is displayed on the television 16 (monitor). Describing specific image processing, a scene is first produced in the three-dimensional virtual space (world coordinate system), and the scene produced in the virtual space is converted (perspective transformation) into a coordinate system captured from the virtual camera (camera coordinate system). For example, an image viewed from the viewpoint is perspective-projected on a virtual screen. Next, clipping and hidden-surface-removal processing are performed. Subsequently, by applying shading, brightness (shade) of an object surface is expressed. Furthermore, by applying shadowing, a shadow caused by the object is expressed. Then, texture mapping is performed. A two-dimensional image is thus produced (drawn) and two-dimensional image data corresponding to the produced two-dimensional image is output to the television 16 via the AV-IC 36 and the AV connector 38. Producing two-dimensional image data from three-dimensional data is called rendering.

Figure 4:
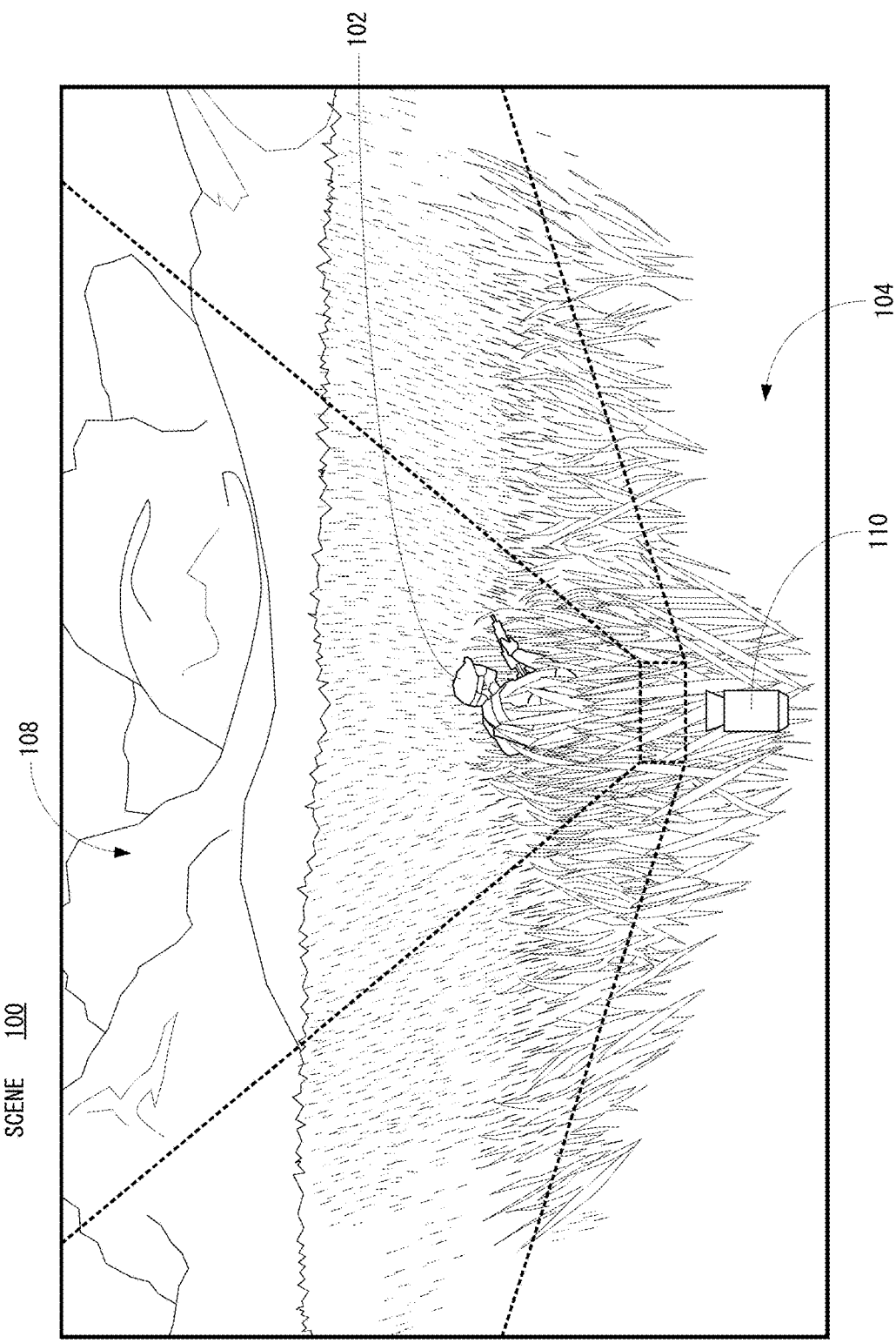
FIG. 4 is an illustration view showing a part of a non-limiting example scene in which various kinds of objects are arranged in a virtual space in bird's-eye view.

FIG. 4 is an illustration view showing a part of anon-limiting example scene 100 that is produced in the virtual space viewed from diagonally above in bird's-eye view. In addition, since FIG. 4 is an illustration view for explaining an image including arrangement of the virtual camera, it differs from a game image (see FIG. 5) that is produced based on the virtual camera concerned. This is true about FIG. 8 and FIG. 15 described later.

In this scene 100, a player character or player object 102 is arranged on a ground object 104. Moreover, an object 106 (hereinafter, called "grassland object") imitating a grassland (grassy) of comparatively long length on the ground object 104 is arranged, and the player object 102 is in the grassland object 106. Moreover, a virtual camera 110 is arranged so as to gaze at (image) this player object 102. That is, the player object 102 is included within a field of view (range capable of being imaged) of the virtual camera 110. The field of view is a field of view of a truncated quadrangular pyramid (view volume), and in FIG. 4, it is indicated by a dotted line (this is true for FIG. 8 and FIG. 15). However, a part such as a bottom surface of the truncated quadrangular pyramid protrudes outside a part of the illustrated scene 100. Moreover, an upper surface of the truncated quadrangular pyramid is a near clipping plane, and a bottom surface thereof is a far clipping plane. Furthermore, when viewing the player object 102 from the virtual camera 110, an object imitating a mountain or/and rock (hereinafter, in this specification, merely called "mountain object") 108 is arranged on the other side (back side) of the grassland object 106.

In addition, the ground object 104, the grassland object 106 and the mountain object 108 may be collectively referred to as a background object.

Moreover, in FIG. 4, in referring to an object corresponding to each grass that constitutes the grassland object 106, each object may be called "grass object 106a. Hereinafter, the same is applied.

Figure 5:
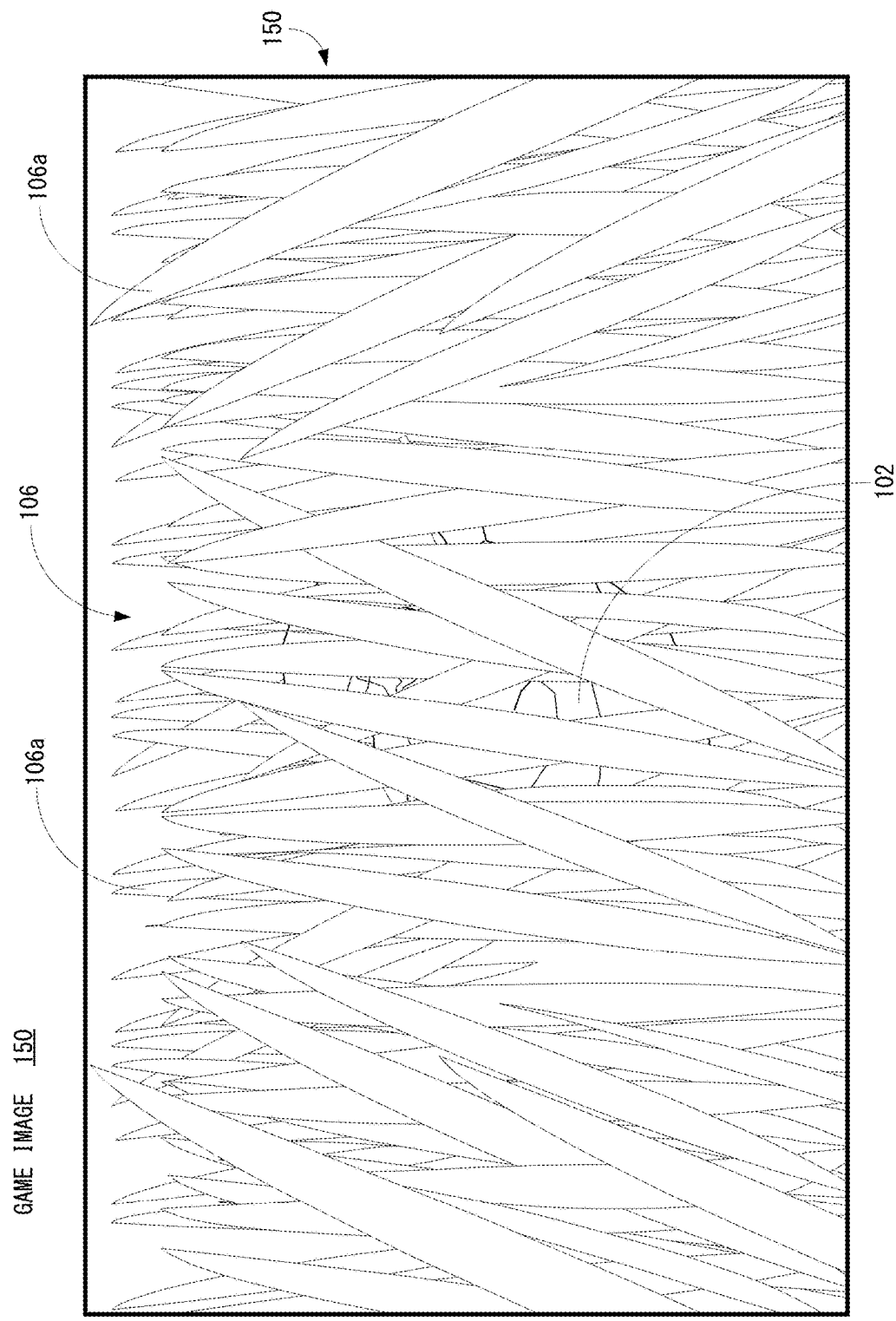
FIG. 5 is an illustration view showing a non-limiting example image that is imaged by a virtual camera in a case shown in FIG. 4.

Since the image that is imaged by the virtual camera 110 is displayed on the television 16 as described above, an image (game image) 150 as shown in FIG. 5 is displayed on the television 16 in the scene 100 shown in FIG. 4. As shown in FIG. 5, a part of the grassland object 106 is included in the game image 150. Since a length of each grass object 106a constituting the grassland object 106 is comparatively long as described above, the player object 102 is hidden by a plurality of grass objects 106a in the game image 150. Therefore, the player object 102 is almost invisible.

Thus, in a state where the player object 102 is almost invisible, in the past, there was a case where processing that makes transparency of the object (a plurality of grass objects 106a) arranged between the player 102 and the virtual cameras 110 high is performed, whereby a game image including the player object 102 that is imaged by the virtual camera 110 through the grass objects 106a being made translucent can be displayed on the television 16.

Although the state where the player object 102 is invisible can be avoided in such a conventional method or processing, since the grass object 106a is changed to be translucent, the user or player who sees a game image including translucent grass objects 106a that do not exist in reality feels discomfort. That is, an appearance of the game image is unnatural.

In order to avoid such inconvenience, in this embodiment, when there exists, in the game image, an object such as a grass object 106a (hereinafter, may be called "vertically-long object) that is densely arranged on the ground object 104 and thus reduces visibility of a part or whole of a predetermined object such as the player object 102, the vertically-long object is deformed or moved so as to go away from the virtual camera 110.

In this embodiment, deformation of the vertically-long object means that a shape or/and size of the vertically-long object is changed, that a direction of the vertically-long object is changed, or that the direction and the shape of the vertically-long object are changed. Moreover, movement of the vertically-long object means that a position of the vertically-long object is changed, that a direction of the vertically-long object is changed, or that the direction and a shape of the vertically-long object are changed. Therefore, it is possible to say that the vertically-long object is transformed and also that the vertically-long object is moved, when the direction of the vertically-long object is changed or the direction and the shape of the vertically-long object are changed.

Figure 6:
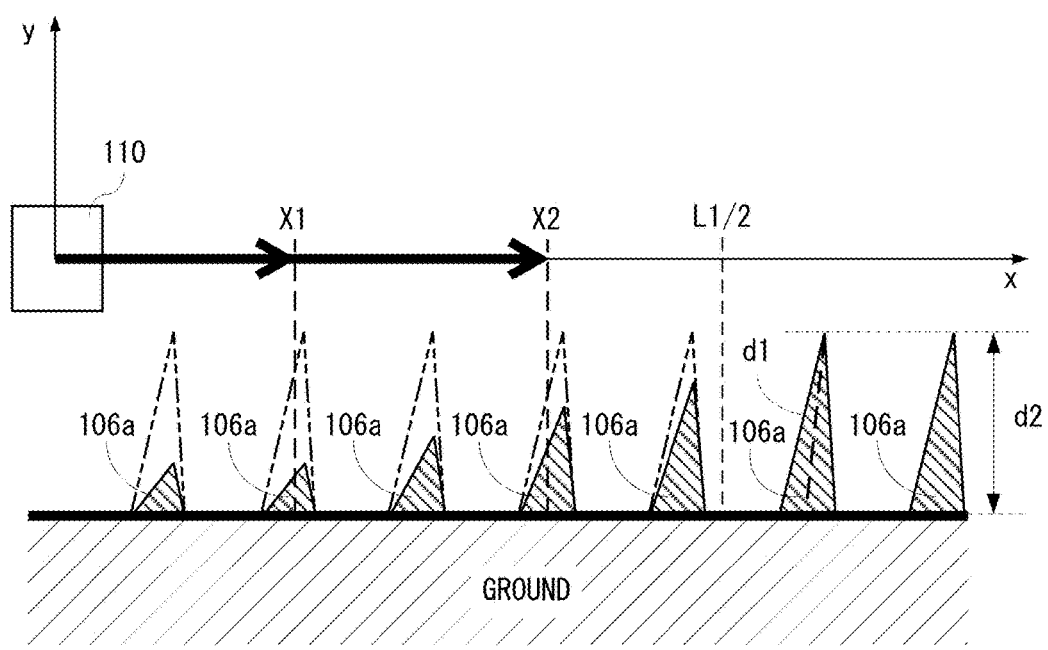
FIG. 6 is an illustration view showing a non-limiting example method of controlling a vertically-long object so as to go away from the virtual camera.
Figure 7:
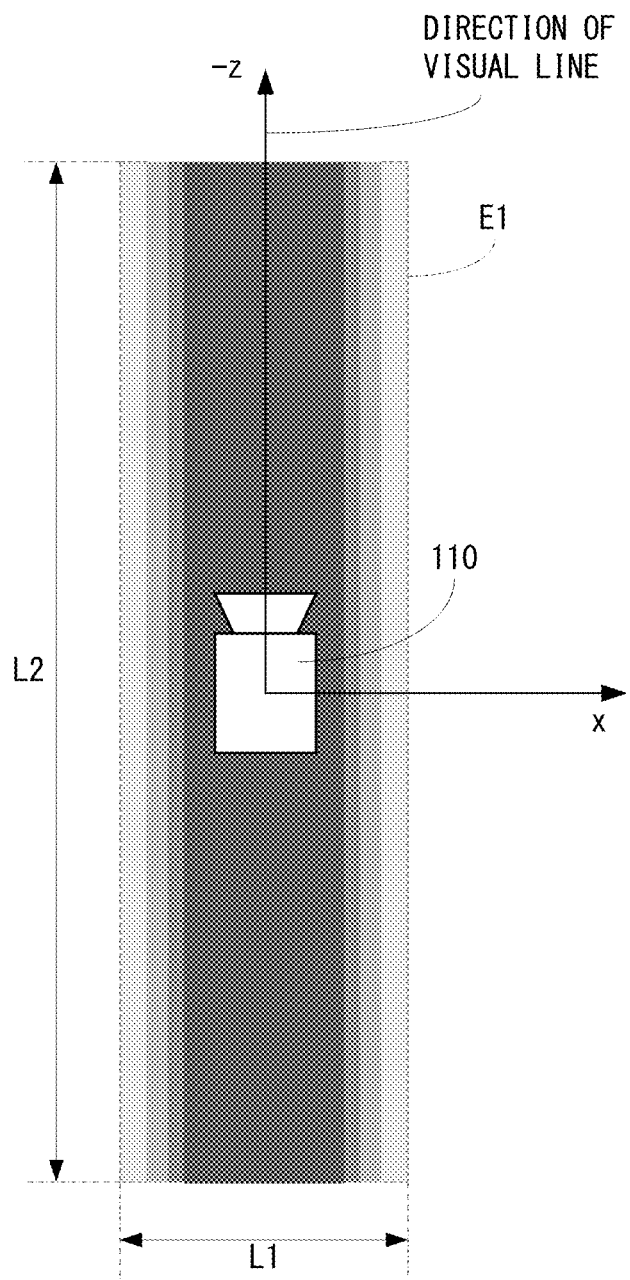
FIG. 7 is an illustration view showing non-limiting example parameter that is set in order to change a height of the vertically-long object when explaining using FIG. 6.

FIG. 6 is an illustration view showing a non-limiting example case of changing the vertically-long object so as to go away from the virtual camera 110. FIG. 7 is an illustration view showing non-limiting example range and change of parameter that the vertically-long object is deformed so as to go away from the virtual camera 110.

As shown in FIG. 6 and FIG. 7, in this embodiment, a height H of the vertically-long object within a predetermined range E1 including the virtual camera 110 is changed on the basis of this virtual camera 110 in the virtual space. In this respect, the range E1 can be called a range where the height H of the vertically-long object is controlled (height control range). The same is applied to other ranges E2 and E3 described later.

However, a three-dimensional coordinate system (local coordinate system) is set to the virtual camera 110 with its three-dimensional position as a reference (center O). As shown in FIG. 6 and FIG. 7, an axis that is overlapped with a line of sight of the virtual camera 110 and extended horizontally is set as a z axis. Moreover, an axis that passes the position of the virtual camera 110 and is extended vertically is set as a y axis. Then, an axis that is extended perpendicular to both the y axis and the z axis is set as an x axis.

In addition, in the examples shown in FIG. 6 and FIG. 7, although the line of sight of the virtual camera 110 and the z axis overlap with each other, when a direction of the virtual camera 110 is inclined upward or downward from a horizontal direction, the line of sight and the z axis do not overlap with each other.

Moreover, as shown in FIG. 6 and FIG. 7, a direction of the line of sight of the virtual camera 110 is set as a minus (−) direction of the z axis, a right direction at the time of turning to the direction of the line of sight of the virtual camera 110 is set as a plus (+) direction of the x axis, an upward direction at the time of turning to the direction of the line of sight of the virtual camera 110 is set as a plus (+) direction of the y axis. Hereinafter, the same is applied to a local coordinate system that is set to the virtual camera 110.

As shown in FIG. 6, in the local coordinate system set to the virtual camera 110, a height H of the vertically-long object is changed so that the height H becomes higher (increases) as the vertically-long object goes away from the z axis (line of sight) in the x axis direction. That is, in the same direction (including an oblique direction), the height H of the vertically-long object is increased as the distance from the virtual camera 110 increases. For example, each grass object 106a that constitutes the grassland object 106 and is a vertically-long object is formed in a shape of a vertically-long triangle, and its height H is changed so as to become large as it separates from the z axis. However, in this embodiment, a position of each grass object 106a is set at a center point of a side where the grass object 106a concerned is brought into contact with the ground in the virtual space.

As seen also in FIG. 6, the height H of the grass object 106a is increased as a value (absolute value) of the x coordinate of the grass object 106a at the time of being expressed by the local coordinate system that is set to the virtual camera 110 is larger. Although illustration is omitted, likewise, the height H of the grass object 106a is increased as it departs away from the virtual camera 110 with respect to a left side (the minus (−) direction of the x axis) of the virtual camera 110. Conversely, the smaller the absolute value of the x coordinate of the grass object 106a is, the smaller the height H of the grass object 106a is. For example, in the example shown in FIG. 6, since the x coordinate X2 of the fourth grass object 106a counted from a side of the virtual camera 110 is larger than the x coordinate X1 of the second grass object 106a, the height H of the fourth grass object 106a is made higher than the height H of the second grass object 106a. That is, as the horizontal distance K from the line of sight of the virtual camera 110 increases, the height H of the grass object 106a is gradually increased. However, in the example shown in FIG. 6, a default (original) height H of each grass object 106*a* is set to be the same.

In this embodiment, the height H of the grass object 106*a* is changed gradually (stepwise) according to a size (value) of the x coordinate, as described later. Moreover, in this embodiment, the height H of the grass object 106*a* is changed by changing a vertical length (straight line distance d1) of the grass object 106*a*.

Furthermore, the height H of the grass object 106*a* is changed within a range defined by upper and lower limits. The upper limit of the height H of the grass object 106*a* is set in advance to a value determined by a predetermined ratio (70%, for example) of the height of the player object 102, as an example. Moreover, the lower limit of the height H of the grass object 106*a* is set to a value of the half of the height of the virtual camera 110 from the ground, as an example.

However, the upper limit of the height H may be variably set according to the position (height) of the virtual camera 110 with respect to the player object 102. For example, when the virtual camera 110 images the player object 102 from obliquely above, the upper limit of the height H is set to a comparatively large value, and when the virtual camera 110 images the player object 102 from behind or obliquely below, the upper limit of the height H is set to a comparatively small value. Moreover, regardless of the virtual camera 110, the lower limit of the height H may be set to a default height H of the grass object 106*a* from the ground (the surface (upper surface) of the ground object 104), or may be determined based on a default length of the grass object 106*a*.

As shown in FIG. 6, the height H of the grass object 106*a* is determined in accordance with a length of the grass object 106*a* (straight line distance d1 that connects a bottom side and the apex) or a straight line distance d2 from the ground to the apex (highest point) of the grass object 106*a*. Although the straight line distance d1 is constant irrespective of an inclination of the grass object 106*a* to the ground, the straight line distance d2 is changed according to the inclination of the grass object 106*a* to the ground. Therefore, when the grass object 106*a* is arranged on the ground object 104 vertically upward, the straight line distance d1 is equal to the straight line distance d2; however, when the grass object 106*a* is arranged obliquely upward on the ground object 104, the straight line distance d1 is larger than the straight line distance d2.

Moreover, as described above, in this embodiment, the height H of the grass object 106*a* can be changed within the predetermined range E1 centered (reference) on the position of the virtual camera 110. In FIG. 7, an outer frame (outside) of the range E1 is shown by a dotted line.

As shown in FIG. 7, the range E1 is defined, in this embodiment, by a quadrangle (rectangle) having a predetermined length L1 in the direction of the x axis and a predetermined length L2 in the direction of the z axis. However, the center of the range E1 is set at the position of the virtual camera 110. Moreover, for example, the length L1 is set based on a size (breadth) of a body of the player object 102, and the length L2 is set based on the distance between the player object 102 and the virtual camera 110. However, the distance between the player object 102 and the virtual camera 110 is a distance (horizontal distance or straight line distance) that is set in advance when the virtual camera 110 moves so as to follow the player object 102. In this embodiment, the length L1 is set to be equal to or slightly larger than a diameter or a major axis when approximating the body (or main body) of the player object 102 with a circular or elliptical shape of a plane parallel to a horizontal plane. Moreover, the length L2 is set as twice a distance slightly longer than a default distance between the player object 102 and the virtual camera 110, which is set up when following the player object 102.

In addition, although the range E1 is set centering on the virtual camera 110 as shown in FIG. 7, since the game image 150 is an image that is imaged by the virtual camera 110, the range E1 may be set only in a minus (−) direction of the z axis from the near clipping plane in front of the virtual camera 110 or from the center (viewpoint) of the virtual camera 110, for example.

Moreover, in this embodiment, as shown also in FIG. 6, the height H of the grass object 106*a* is made to be gradually high as it goes away from the virtual camera 110. Therefore, the parameter (a coefficient or magnification) that change the height H of the grass object 106*a* is gradually enlarged as it goes in the plus (+) direction and the minus (−) direction of the x-axis from the line of sight (line overlapping with the z axis) of the virtual camera 110.

However, the parameter is numerical value smaller than 1 (one). In FIG. 7, a difference in value of the parameter is indicated by a difference in gray brightness within the range E1. However, the brighter the gray, the larger the value of the parameter is.

Moreover, a gradual change of the parameter may be a linear change (change according to a primary function) or a parabolic change (change according to a secondary function). Furthermore, instead of gradual change, the height H itself may be changed linearly or changed parabolically.

Figure 8:
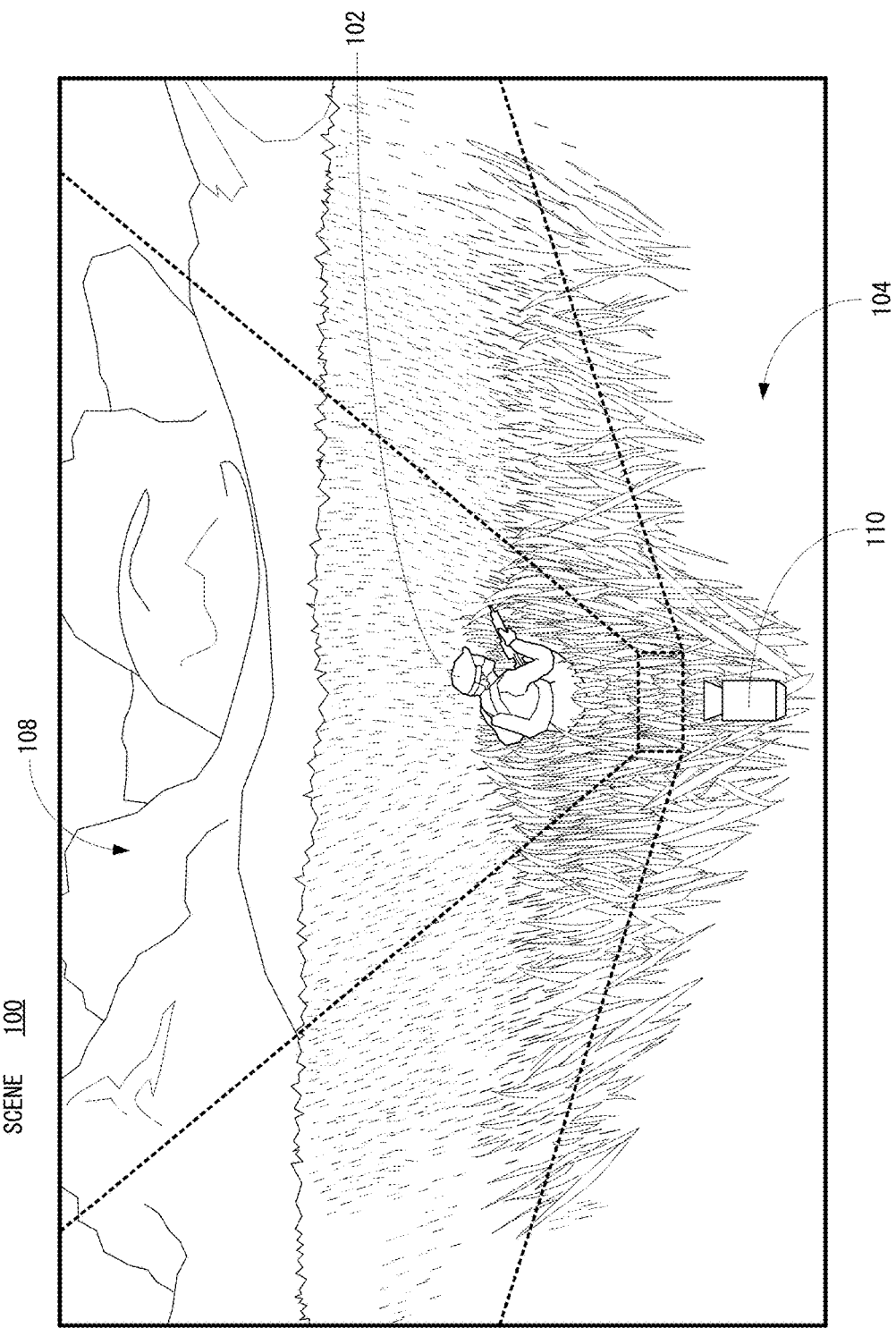
FIG. 8 is an illustration view showing a non-limiting example case where the height of the vertically-long object is changed in a part of the scene shown in FIG. 4 in bird's-eye view.
Figure 9:
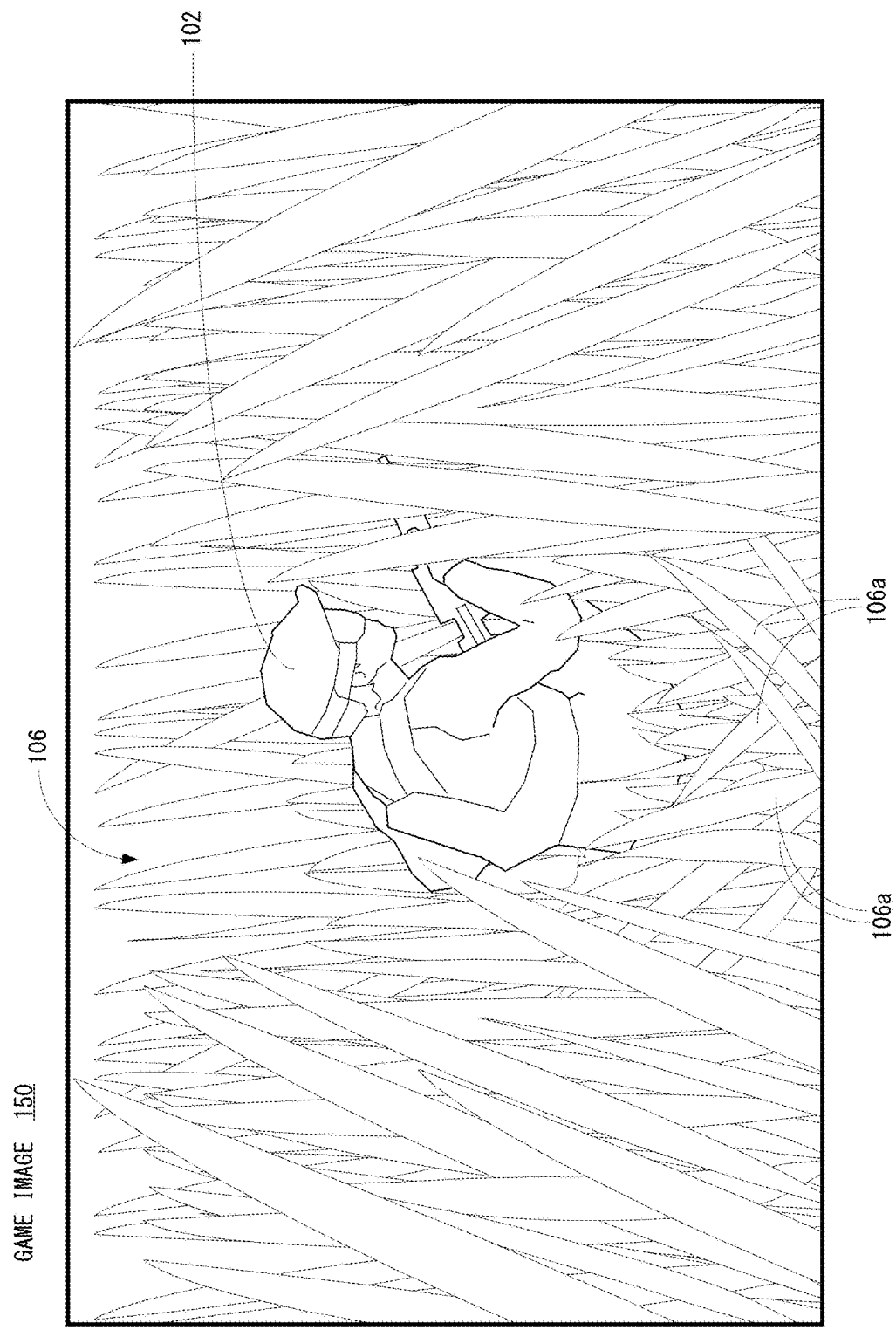
FIG. 9 is an illustration view showing a non-limiting example image that is imaged by the virtual camera in a part of the scene shown in FIG. 8.

When the parameter set as shown in FIG. 7, the height H of some grass objects 106*a* is changed in the scene 100 shown in FIG. 4, and therefore, the scene 100 is changed as shown in FIG. 8. As seen also in FIG. 8, since the height H of at least the grass objects 106*a* arranged between the virtual camera 110 and the player object 102 is made low, when viewing the player object 102 from the virtual camera 110, as compared with the scene 100 shown in FIG. 4, the visibility of the player object 102 is made high. Therefore, as shown in FIG. 9, also in the image (game image 150) that is imaged by the virtual camera 110, the height H of the grass object 106*a* that had hidden the player object 102 is made low, and accordingly, the visibility of the player object 102 is made high.

As clearly understood from FIG. 6, the processing that lowers the height H of the grass object 106*a* is a modification that the grass object 106*a* goes away from the virtual camera 110. For example, a position of a center of gravity of the grass object 106*a* goes away from the virtual camera 110. Moreover, a position of a nearest point from the virtual camera 110 in the grass object 106*a* goes away from the virtual camera 110. It is possible to say that the modification that shortens the height H of the grass object 106*a* is a modification that the grass object 106*a* goes away from the virtual camera 110.

Moreover, the height H of the grass objects 106*a* are changed in the grass objects 106*a* arranged in the above-described range E1, since the height H of the grass objects 106*a* are gradually increased toward the left and right end portions of the game image 150, the player who sees the game image 150 obtains a bodily sensation as if seeing the player object 102 by pushing aside the grass objects 106*a*. Therefore, the appearance of the game image 150 almost does not become unnatural.

As described above, in this embodiment, the height H of the grass object 106*a* is changed by changing the length of the grass object 106*a* (straight line distance d1), but a method of keeping away the grass object 106*a* from the virtual camera 110 does not need to be limited to this.

Figure 10A:
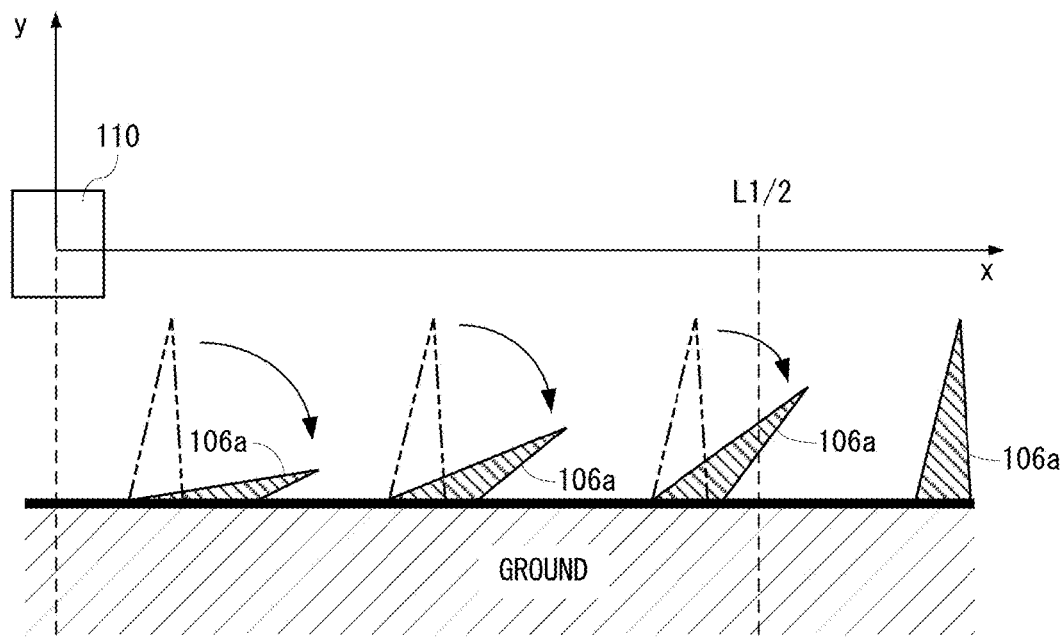
FIG. 10(A) is an illustration view showing a non-limiting example second method of controlling the vertically-long object so as to go away from the virtual camera.

For example, as shown in FIG. 10(A), it is possible to change the height H of the grass object 106*a* by changing (moving) the direction (inclination) of the grass object 106*a*. That is, as for the grass object 106*a*, when the distance in the x axis direction from the virtual camera 110 increases, an inclination angle (degree of inclination) is gradually decreased, so that the height H is gradually increased. However, the direction that the grass object 106*a* is inclined is a direction that the grass object 106*a* goes away from the virtual camera 110 or the line of sight of the virtual camera 110.

In addition, when inclining the grass object 106*a* in the direction shown in FIG. 10(A), the grass object 106*a* is not only inclined but a part of its shape is deformed so that the grass object 106*a* does not stick to the ground object 104. Although illustration is omitted, when inclining the grass object 106*a* in a direction perpendicular to a paper plane of FIG. 10(A), since the grass object 106*a* is inclined with its bottom side as its axis, it is not necessary to deform its shape. Moreover, in FIG. 10 (A), in order to show intelligibly that the grass object 106*a* is inclined, the number of the grass objects 106*a* is made to be smaller than in other cases.

Figure 10B:
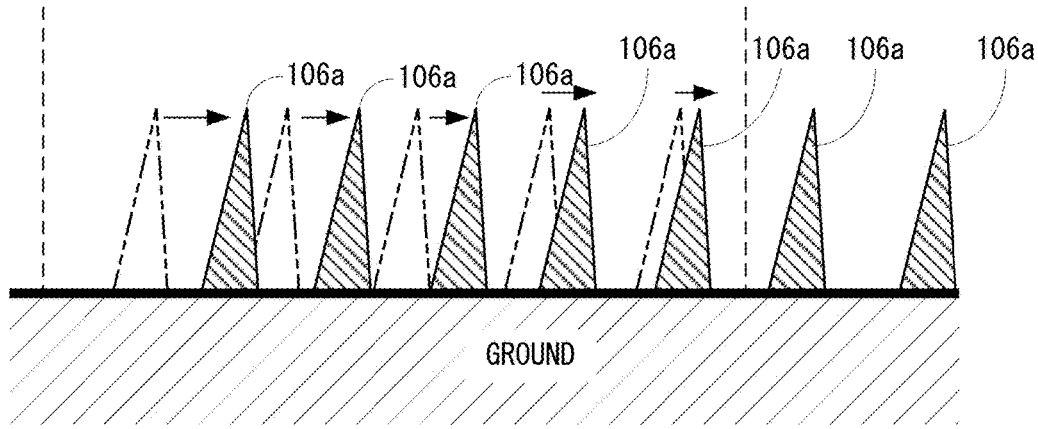
FIG. 10(B) is an illustration view showing a non-limiting example third method of controlling the vertically-long object so as to go away from the virtual camera.

Furthermore, as shown in FIG. 10(B), it is possible to arrange the grass object 106*a* so that the grass object 106*a* goes away from the virtual camera 110 by moving an arranged position of the grass object 106*a*. That is, as for the grass object 106*a*, if the distance of the direction of the x axis from the virtual camera 110 becomes large, a moved distance (moving amount or degree of movement) is made to be gradually small. Even in this way, the player who sees the game image 150 can obtain a bodily sensation as such that the virtual camera 110 images while pushing aside the grass objects 106*a*. However, the direction that the grass object 106*a* is moved is a direction separating from the virtual camera 110 or the line of sight of the virtual camera 110.

In addition, even in a case shown in FIG. 10(A) and FIG. 10(B), when the arranging position of the grass object 106*a* is outside the range E1 (L1/2, L1 is maximum value in the direction of the x axis), the grass object 106*a* concerned is not inclined and the arranging position of the grass object 106*a* concerned is not moved. Moreover, even in a case shown in FIG. 10(A) and FIG. 10(B), when the height H after being changed exceeds the upper limit or the lower limit, the height H is set (changed) to the upper limit or the lower limit. These are the same about other cases.

Figure 11:
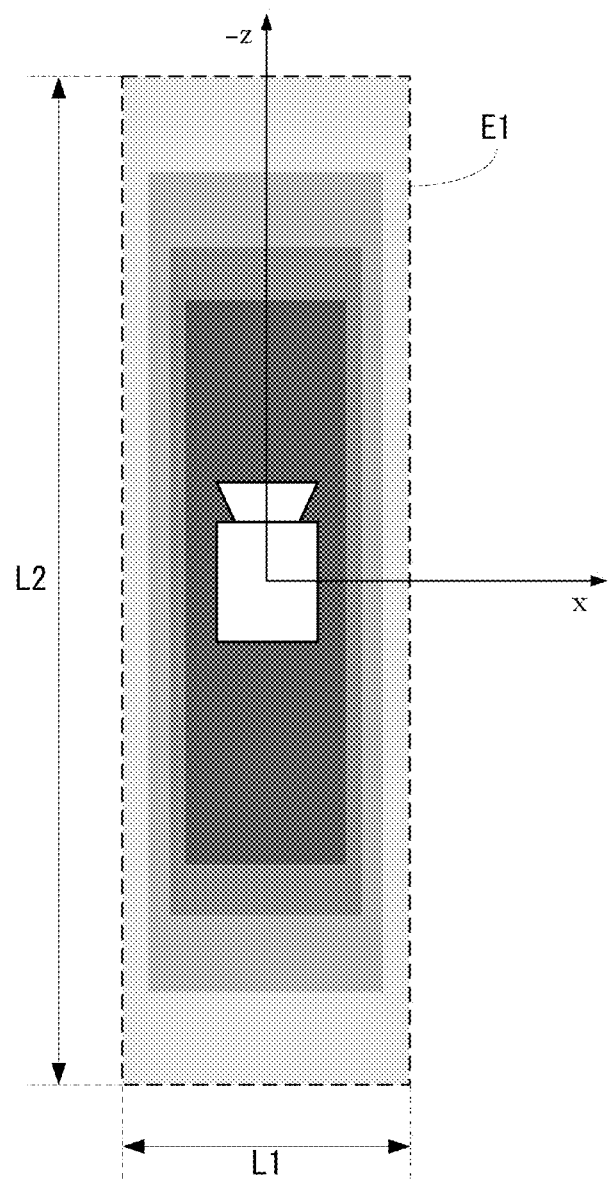
FIG. 11 is an illustration view showing other non-limiting example parameter that is set in order to change the height of the vertically-long object.

FIG. 11 is an illustration view for explaining other non-limiting example parameter that is set in order to change the height H of the grass object 106*a*. In the example shown in FIG. 11, parameter is set so that the height H of the grass object 106*a* is gradually changed not only about a direction of the x axis but about a direction of the z axis in the range E1. Therefore, when viewing the virtual space (scene 100) from the virtual camera 110, the height H of the grass object 106*a* is made to be gradually high as it departs to the left and right from the line of sight and as it goes backward in the direction of the line of sight. Therefore, although illustration is omitted, an appearance of a game image 150 in a depth direction is more natural than the game image 150 shown in FIG. 9.

Moreover, although the height H of the grass object 106*a* is changed according to the horizontal distance K (distance of the direction of the x axis or/and distance of the direction of the z axis) from the virtual camera 110 in the above-described example, it does not need to be limited to this. It is possible to change the height H of the grass object 106*a* while taking into consideration not only the horizontal distance K with the virtual camera 110 but further the height of the virtual camera 110. In such a case, as described above, the height H of the grass object 106*a* can be determined as the height H (called "height H1" for convenience of explanation) that is determined according to the horizontal distance K with the virtual camera 110, or as the height H (called "height H2" for convenience of explanation) of the grass object 106*a* that is determined according to a three-dimensional distance R with the virtual camera 110. Moreover, although the height H of the grass object 106*a* is determined to be the larger one of the height H1 and the height H2 in this embodiment, it may be determined to be the smaller one.

Figure 12:
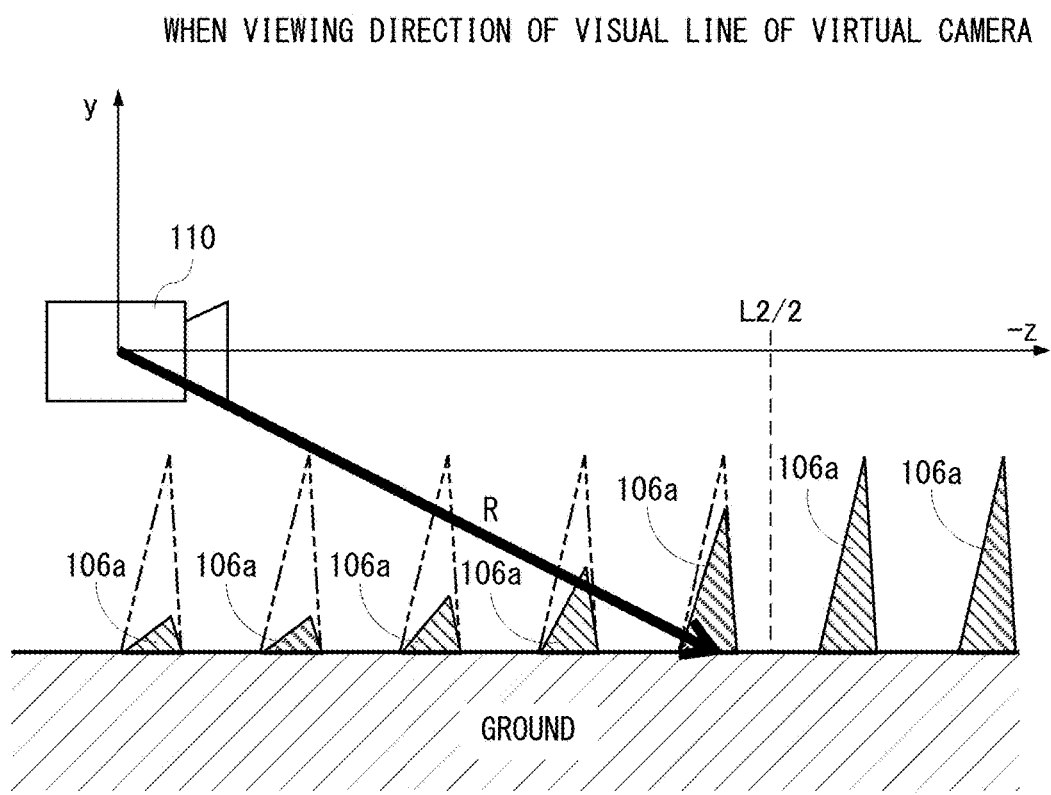
FIG. 12 is an illustration view showing a non-limiting example fourth method of controlling the vertically-long object so as to go away from the virtual camera.
Figure 13:
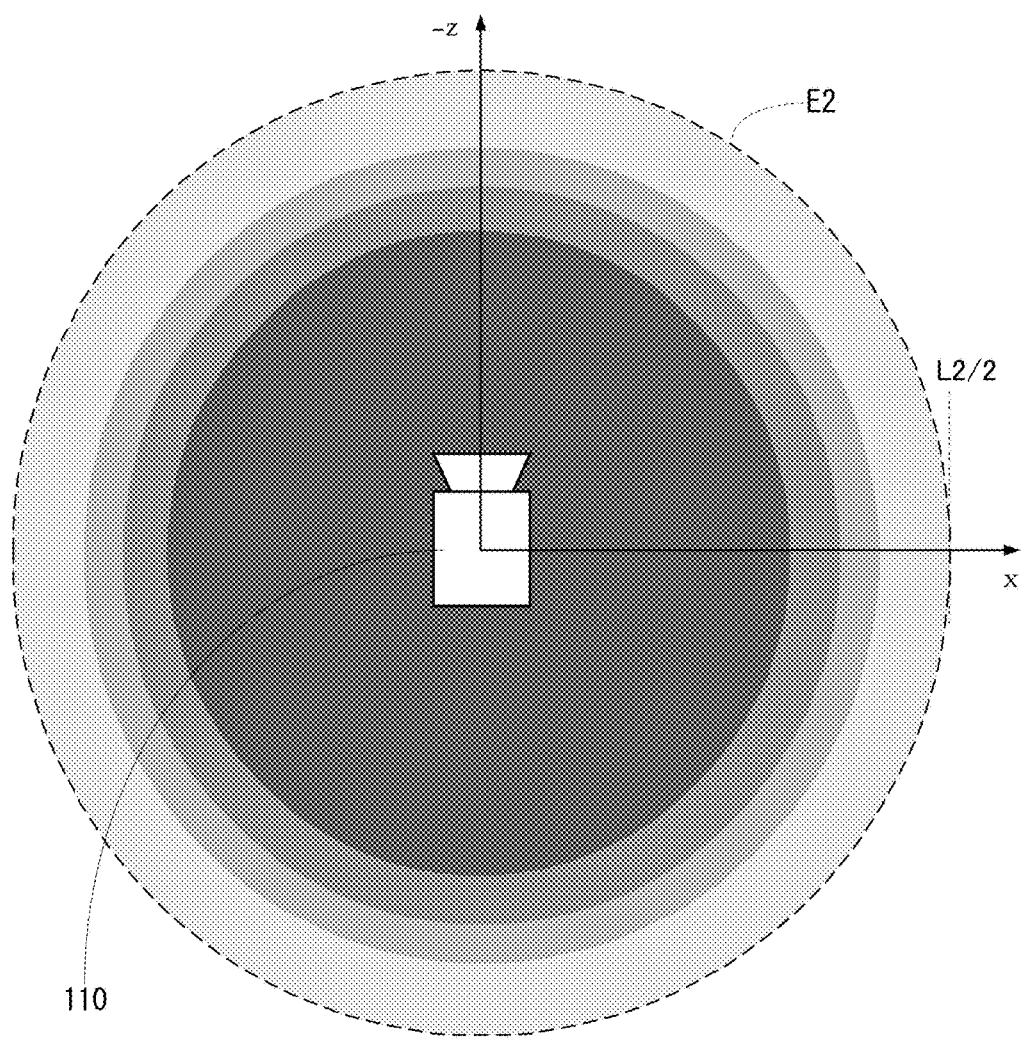
FIG. 13 is an illustration view showing non-limiting example parameter that is set in order to change a height of the vertically-long object when explaining using FIG. 12.

FIG. 12 is an illustration view for explaining a method that the height H2 of the grass object 106*a* is changed according to the three-dimensional distance R, and FIG. 13 is an illustration view for explaining the parameter that is set when changing the height H2 of the grass object 106*a* according to the three-dimensional distance R as shown in FIG. 12.

As shown in FIG. 12, the three-dimensional distance R is a straight line distance between a three-dimensional position of the virtual camera 110 and a three-dimensional position of the grass object 106*a*. Although FIG. 12 shows a case where the height H of the grass object 106*a* that is arranged in a position overlapping with the direction of the line of sight (z axis) of the virtual camera 110 is changed, the height H is also changed about the grass object 106*a* that is arranged in a position overlapping with another direction within an xz plane in the local coordinate system that is set to the virtual camera 110. Moreover, the height H of the grass object 106*a* may be changed so as to be proportional to a square of the three-dimensional distance R, for example.

Therefore, as shown in FIG. 13, the parameter is set so that the height H of the grass object 106*a* may become high gradually as a length of the three-dimensional distance R (radius) becomes large. Although the range E2 where the height H is changed is a circular form as shown in FIG. 13, since a radius L2/2 defining this range E2 is the three-dimensional distance R, the horizontal distance K from the virtual camera 110 as well as the height of the virtual camera 110 are taken into account. As described above, the parameter that is set gradually is proportional to the square of the three-dimensional distance R. Therefore, for example, when the height H of the grass object 106*a* is changed using only the parameter is set as shown in FIG. 13, the grassland object 106 is deformed so as to form a mortar shaped depression that a diameter is made to gradually become with a center of the virtual camera 110. Such a gradual change of the diameter is a parabola-like.

By taking into consideration the height of the virtual camera 110 in addition to the horizontal distance K with the virtual camera 110, the parameter that is set in order to change the height H of the grass object 106*a* are set as similar to a case shown in FIG. 11. However, in this case, in accordance with whether the height H of the grass object 106*a* located near or far from the virtual camera 110 is to be changed linearly or parabolically, a change amount of the parameter (slope of primary function) that changes the height H1 according to the horizontal distance K and a change amount of the parameter (opening degree of parabola) that changes the height H2 according to the three-dimensional distance R are determined. With either method, it is possible to enhance the visibility of the scene in the virtual space while maintaining the natural appearance as much as possible. In particular, when the default (original) height H (length) of the grass object 106*a* is comparatively large (long), a high effect on visibility improvement can be obtained.

Moreover, although when calculating the height H 2 of the grass object 106*a*, the parameter is set so as to be in proportion to the square of the three-dimensional distance R here, similar to a case of the horizontal distance K, the parameter that is linearly changed may be set so as to be proportional to the three-dimensional distance R. In such a case, the parameter for determining the height H1 and the parameter for determining the height H2 are set so that respective change amounts (slopes of primary function) may differ from each other.

In the examples shown in FIG. 4-FIG. 13, it is described that the visibility of the player object 102 is decreased greatly in the game image 150 in which the scene 100 is imaged by the virtual camera 110 when the default (original) height H (length) of the grass object 106*a* is comparatively large (long). In an example shown in FIG. 14-FIG. 16, it will be described that the visibility of the player object 102 is hardly decreased in the game image 150 in which the scene 100 is imaged by the virtual camera 110 when the default (original) height H (length) of the grass object 106*a* is comparatively small (short).

Figure 14:
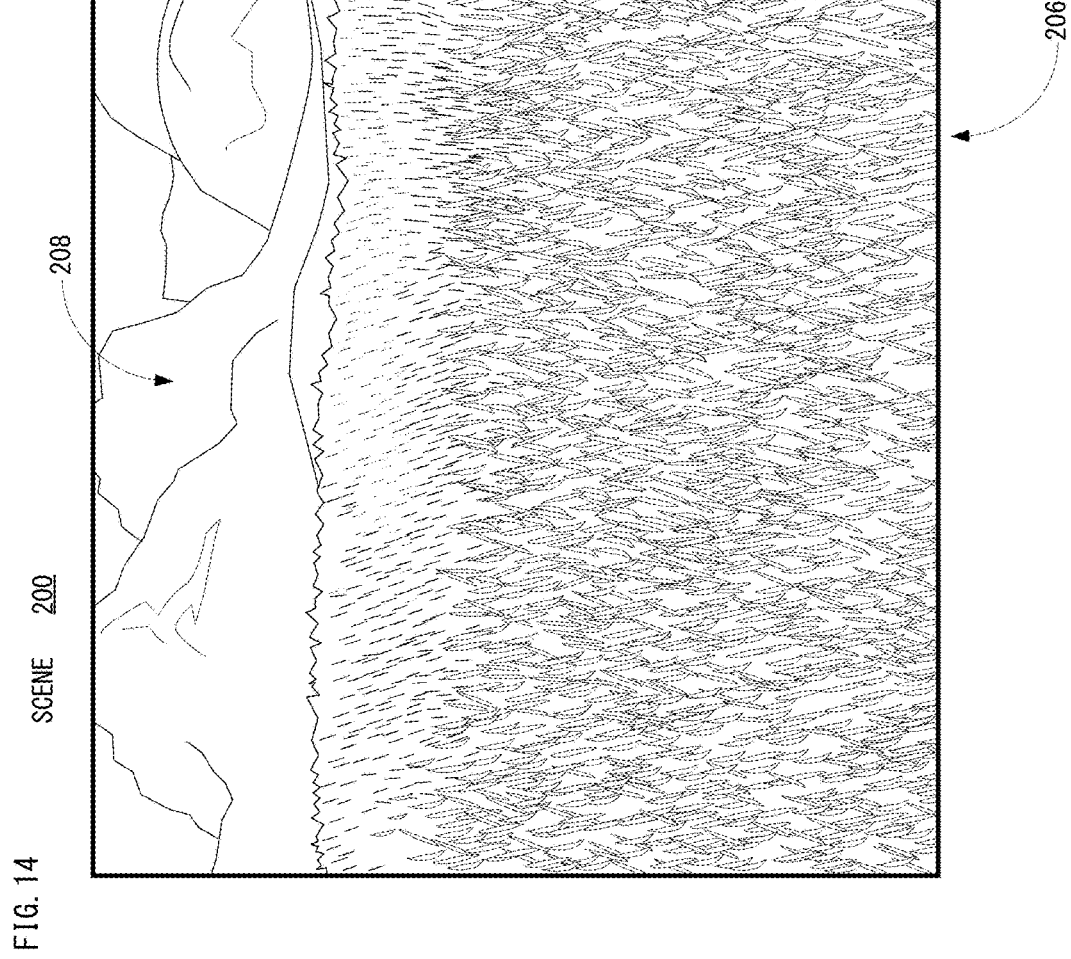
FIG. 14 is an illustration view showing a part of a non-limiting example second scene in which various kinds of objects are arranged in a virtual space in bird's-eye view.

For example, a non-limiting example scene 200 produced in the virtual space is shown in FIG. 14. In the scene 200, background objects such as a ground object 204 (see FIG. 15), a grassland object 206 and a mountain object 208 are arranged. The grassland object 206 is arranged on the ground object 204, and the mountain object 208 is arranged on the other side (back side) of the grassland object 206. It should be noted that in FIG. 14, the player object 102 and the virtual camera 110 are omitted.

Although illustration of a game image in the scene 200 as shown in FIG. 14 is omitted, as described above, even in a case where the player object 102 is imaged so as to be gazed by the virtual camera 110, the grassland object 206 (grass object 206*a*) hardly affects the visibility of the player object 102. Therefore, as shown in FIG. 15, a height H of a grass object 206*a* in a range E3 (see FIGS. 16(A) and 16(B)) that is comparatively near the virtual camera 110 is changed.

Moreover, as shown in FIG. 16(A), in a case of a grass object 206*a* having a comparatively short length, a three-dimensional distance R between a three-dimensional position of the virtual camera 110 and a three-dimensional position of the grass object 206*a* is calculated, and the height H of the grass object 206*a* is changed in accordance with the calculated three-dimensional distance R. A reason why the height H of the grass object 206*a* is thus changed according to the three-dimensional distance R with the virtual camera 110 is that it is mainly determined whether it is necessary to change the height H of the grass object 206*a* according to the height of the virtual camera 110 in a case of the grass object 206*a* with comparatively short length. Therefore, as seen from FIGS. 16(A) and 16(B), the height H of a vertically-long object is changed gradually in proportion to a size of the three-dimensional distance R. For example, although the height H of the vertically-long object is changed in proportion to a square of the three-dimensional distance R, it may be changed linearly so as to be proportional to the three-dimensional distance R.

However, a radius L3/2 defining a size of the range E 3 where the height H is changed is set to be shorter than a length (radius) L2/2 defining a size of the ranges E 1 and E 2. As to how short it is to be set, it can be determined by looking at an actual game image. That is, a size of the radius L3/2 (length L3) is determined so that an appearance of the game image remains natural and does not affect the visibility of the player object 102.

Figure 15:
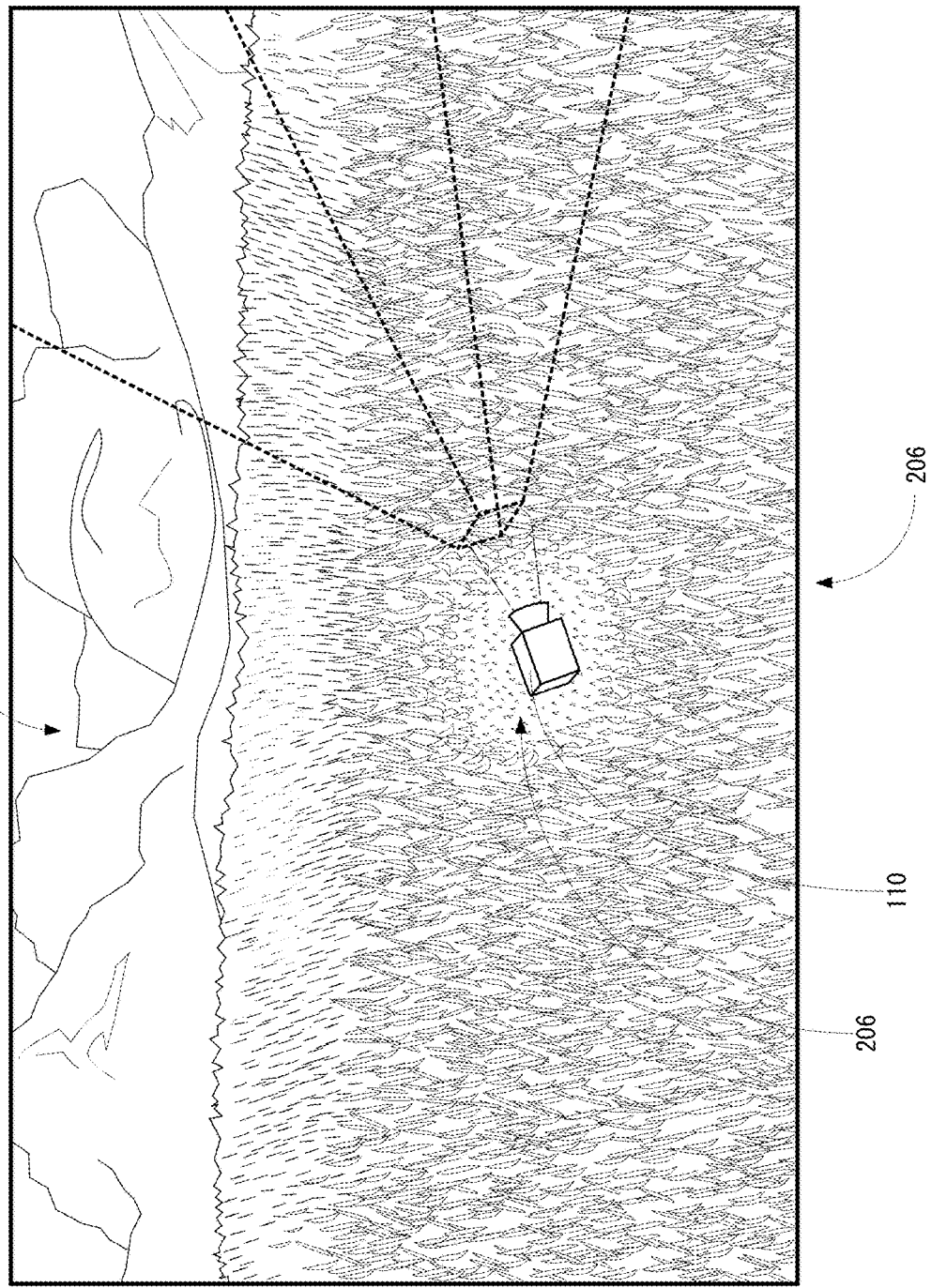
FIG. 15 is an illustration view showing a non-limiting example case where the height of a part of the vertically-long object is changed in a part of the scene shown in FIG. 14 in bird's-eye view.

In addition, even in the case shown in FIG. 14-FIG. 16, when the height H after being changed exceeds an upper limit or a lower limit, the height H is set (changed) to the upper limit or the lower limit. However, in the case shown in FIG. 14-FIG. 16, since the default height H of the grass object 206*a* is low, the height H is set to about 30% of the height of the player object 102, for example. Otherwise, in such a case, the upper limit does not need to be set.

In the game apparatus 12, according to the scene 100 or the scene 200, the range E1 (and range E2) or the range E3 appropriately changing the height of the grass object 106*a* or 206*a* as well as the parameter changing the height are selected.

Figure 17:
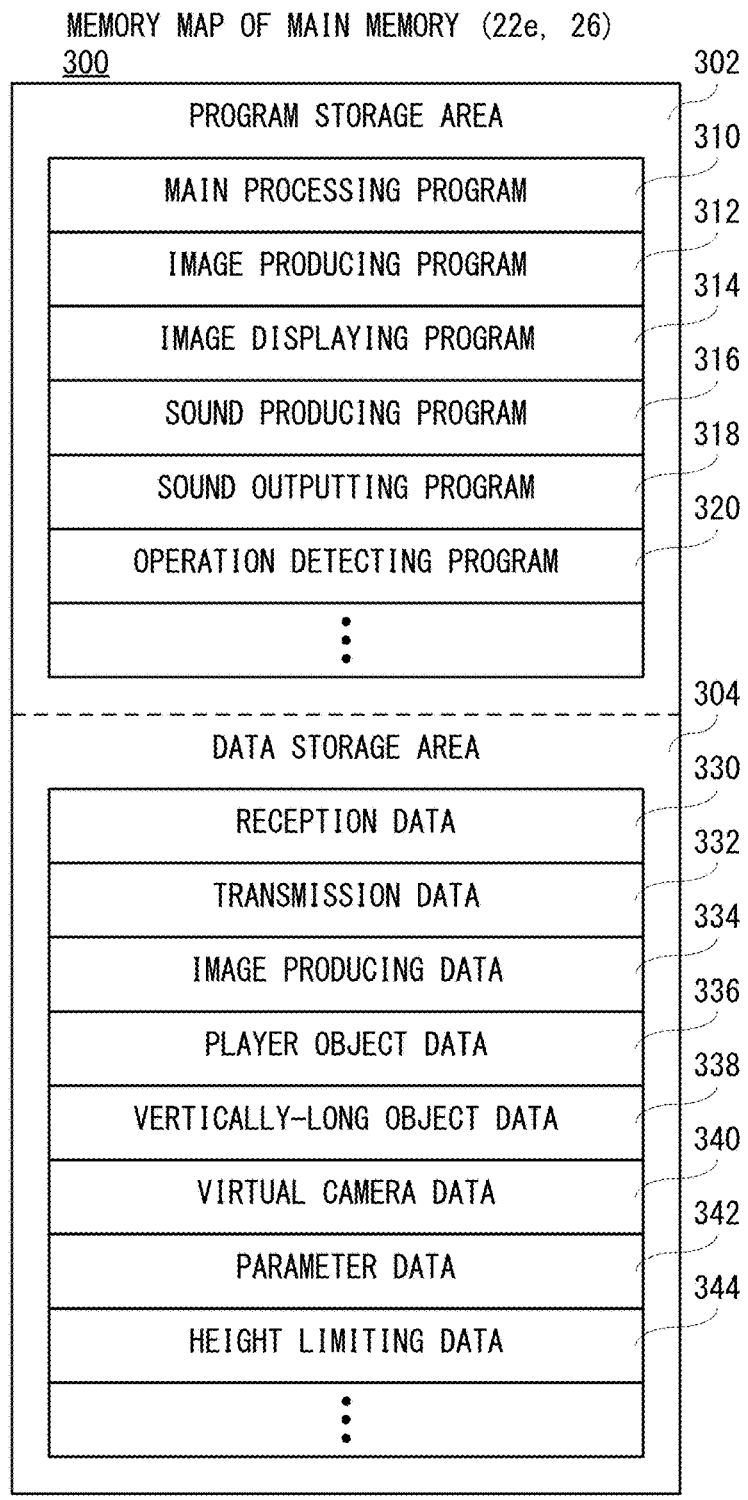
FIG. 17 is a view showing a non-limiting example memory map of a main memory shown in FIG. 2.

FIG. 17 shows a non-limiting example memory map 300 of the main memory (22*e*, 26) of the game apparatus 12 shown in FIG. 2. As shown in FIG. 17, the main memory (22*e*, 26) includes a program storage area 302 and a data storage area 304. An information processing program such as a game program is stored in the program storage area 302. For example, a part or whole of the game program is read from an optical disk at a proper timing(s) to be stored in the main memory (22*e*, 26) after a power supply of the game apparatus 12 is turned on.

In addition, the game program may be acquired from the flash memory 24 or an external information processing apparatus of the game apparatus 12 (for example, via Internet), instead of the optical disk. Moreover, some programs included in the game program may be stored in advance in the game apparatus 12.

In this embodiment, the game program is constituted by a main processing program 310, an image producing program 312, an image displaying program 314, a sound producing program 316, a sound outputting program 318, an operation detecting program 320, etc.

The main processing program 310 is a program for performing processing of a main routine (entire processing shown in FIG. 18) of a virtual game. The image producing program 312 is a program for producing a game image for television with using image producing data 334 including data such as polygon data, texture data, etc. When arranging (modeling) a vertically-long object like the grass object 106*a* according to this image producing program 312, as described above, processing of deforming or moving the vertically-long object so as to go away from the virtual camera 110 is also performed.

The image displaying program 314 is a program for outputting the image data of the game image for television produced according to the image producing program 312 to the AV-IC 36 so as to display the game image for television on the television 16.

The sound producing program 316 is a program for producing a game sound for television by the DSP 22*c* under instructions of the CPU 20. The sound outputting program 318 is a program for outputting sound data of the game sound for television produced according to the sound producing program 316 to the AV-IC 36 so as to output the game sound for television from the speaker 16*a* of the television 16.

The operation detecting program 320 is a program for detecting (receiving) operation data included in the transmission data inputted (transmitted) from the terminal device 14.

In addition, a communication program, a backup program, etc. are also stored in the program storage area 302.

In the data storage area 304, reception data 330, transmission data 332, image producing data 334, player object data 336, vertically-long object data 338, virtual camera data 340, parameter data 342, height limiting data 344, etc. are stored.

The reception data 330 is various kinds of data received from the terminal device 14. The reception data 330 includes operation data. The operation data is data representing an operation of the player to the terminal device 14, and as described above, it includes operation button data, stick data and touch position data. In addition, the operation data may be any data as long as it represents the operation of the player who operates the terminal device 14, and may include only one of the above-described data. The operation data is transmitted from the terminal device 14, acquired in the game apparatus 12, and stored in the main memory (22e, 26).

In addition, a predetermined number of operation data may be stored in the main memory (22 e, 26) in an order from the latest one (lastly acquired).

The transmission data 332 is various kinds of data to be transmitted to the terminal device 14. The image producing data 334 includes data required to produce an image, such as polygon data, texture data, etc.

The player object data 336 includes model data for producing the player object 102 in the three-dimensional virtual space, data about attribute values such as a physical strength value and a level of the player object 102, data about items that the player object 102 possesses, and data about a current position (three-dimensional position) and a direction of the player object 102. The vertically-long object data 338 includes a position, length (straight line distance d1) and direction (direction in a horizontal plane and inclination to the horizontal plane) in the three-dimensional virtual space of each vertically-long object (grass object 106a, in this embodiment). The virtual camera data 340 includes data of a position and a direction of the virtual camera 110 (viewpoint) in the three-dimensional virtual space.

The parameter data 342 includes data about the range E1 (or E1 and E2) and the range E3 for changing the height H of each vertically-long object according to the distance with the virtual camera 110, and data about the parameter that is set corresponding to each range E1 (or E1 and E2) and E3.

The height limiting data 344 includes data about an upper limit or a lower limit of the changed height H of the grass object 106a. As described above, the upper limit of the height H is set according to the height of the player object 102 and the lower limit of the height H is variably set according to the height of the virtual camera 110.

Although illustration is omitted, in the data storage area 304, data about the background objects other than the vertically-long object and the items that appear in the game, other data such as sound data, sound wave form data, etc. are stored, and flags and counters (timers) required for executing the game program are provided.

Figure 18:
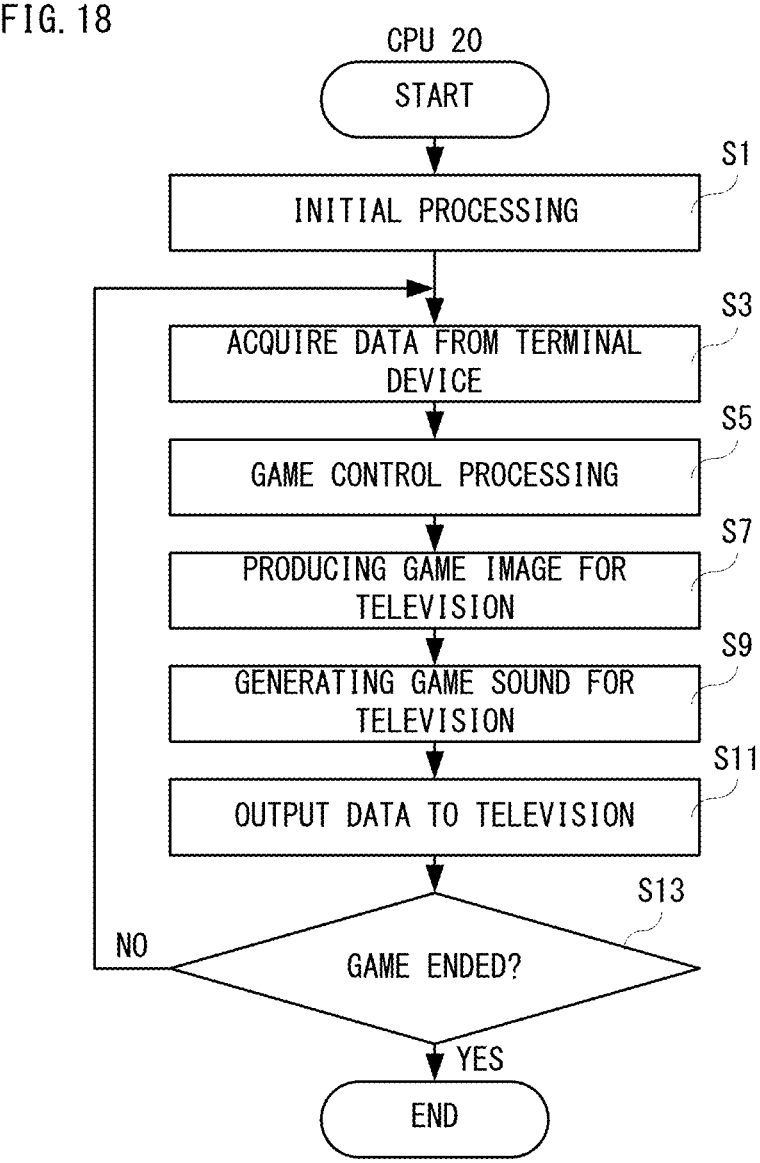
FIG. 18 is a flow chart showing non-limiting example entire processing of a CPU of the game apparatus shown in FIG. 2.

FIG. 18 is a flow chart of the entire processing by the CPU 20 provided in the game apparatus 12 shown in FIG. 2. In addition, it is pointed-out in advance that processing in respective steps in the flow chart shown in FIG. 18 (also in FIG. 19 described later) are mere examples, and if the same result is acquired, an order of the respective steps may be changed. Moreover, in this embodiment, basically, it is assumed that the CPU 20 executes the processing of each step of the flowcharts shown in FIGS. 18 and 19; however, some steps may be executed by a processor(s) or a dedicated circuit(s) other than the CPU 20.

If the power supply of the game apparatus 12 is turned on, prior to executing the entire processing, the CPU 20 executes the boot program stored in a boot ROM not shown, whereby respective units such as the main memory (22e, 26) can be initialized. Then, the game program stored in the optical disk is read into the main memory (22e, 26), and execution of the game program concerned is started by the CPU 20.

As shown in FIG. 18, if the entire processing is started, the CPU 20 performs initial processing in a step S1. In the initial processing, for example, the CPU 20 constructs a virtual game space for producing and displaying the game image 150, arranges respective characters or objects such as the player object 102 appearing in this game space in initial positions, and arranges respective background objects such as the ground object 104 and the mountain object 108 appearing in this game space in predetermined positions. Furthermore, the initial processing is also processing that the CPU 20 sets initial values of various parameter to be used in the game processing.

Subsequently, the CPU 20 acquires various kinds of data transmitted from the terminal device 14 in a step S3, and performs game control processing in a step S5. For example, the CPU 20 moves the player object 102 or/and causes the player object 102 to perform arbitrary actions according to the operation data. Moreover, the CPU 20 moves an enemy object or/and causes the enemy object to perform an arbitrary action, without following the operation data. Furthermore, the CPU 20 judges victory and defeat or ranking of the player object 102, or/and judges the game clear or game over. Furthermore, the CPU 20 moves the position or/and direction of the virtual camera 110 according to the operation data. Although the virtual camera 110 is usually is arranged in the virtual space so as to gaze at the player object 102 and follow the player object 102 concerned while maintaining a predetermined distance with the player object 102, when the position or/and direction are changed by instructions by the player, the virtual camera 110 is located in the position or/and direction after changed.

In a next step S7, the CPU 20 and the GPU 22b perform processing of producing the game image for television to be displayed on the television 16. Briefly describing, the CPU 20 and the GPU 22b read the data showing a result of the game control processing of the step S5 from the main memory (22e, 26), and read data required in order to produce the game image from the VRAM 22d to produce the game image for television. In producing the game image for television, for example, under instructions of the CPU 20, the GPU 22b arranges the player object 102 to a current position in the virtual space, and arranges a non-player character such as an enemy object. Furthermore, the GPU 22b arranges (produces) the background objects according to the current position of the player object 102. The above-described ground object 104, 204, the grassland object 106, 206 (grass objects 106a and 206a) and the mountain object 108, 208 are included in this background objects. Therefore, a certain scene (sight) 100, 200 is produced. An image (imaged image) viewing the scene 100 or 200 from the virtual camera 110 is produced as the game image 150.

Subsequently, in a step S9, the CPU 20 produces a game sound for television to be output to the speaker 16a of the television 16. That is, the CPU 20 causes the DSP 22c to produce the game sound according to the result of the game control processing of the step S5.

Subsequently, the CPU 20 outputs data to the television 16 in a step S11. Specifically, the CPU 20 sends to the AV-IC 36 the image data of the game image for television stored in the VRAM 22d, and the sound data of the game sound for television produced in the step S9 by the DSP 22c.

Then, in a step S13, the CPU 20 determines whether the game is to be ended. Determination in the step S13 is performed, for example, based on whether the game is over or whether the player gives an instruction to stop the game. It is possible to determine whether the game is over based on whether the physical strength value of the player object 102 becomes 0 (zero), for example.

If "NO" is determined in the step S13, that is, if the game is not to be ended, the process returns to the step S3. On the other hand, if "YES" is determined in the step S13, that is, if ending the game, the entire processing is terminated.

Figure 19:
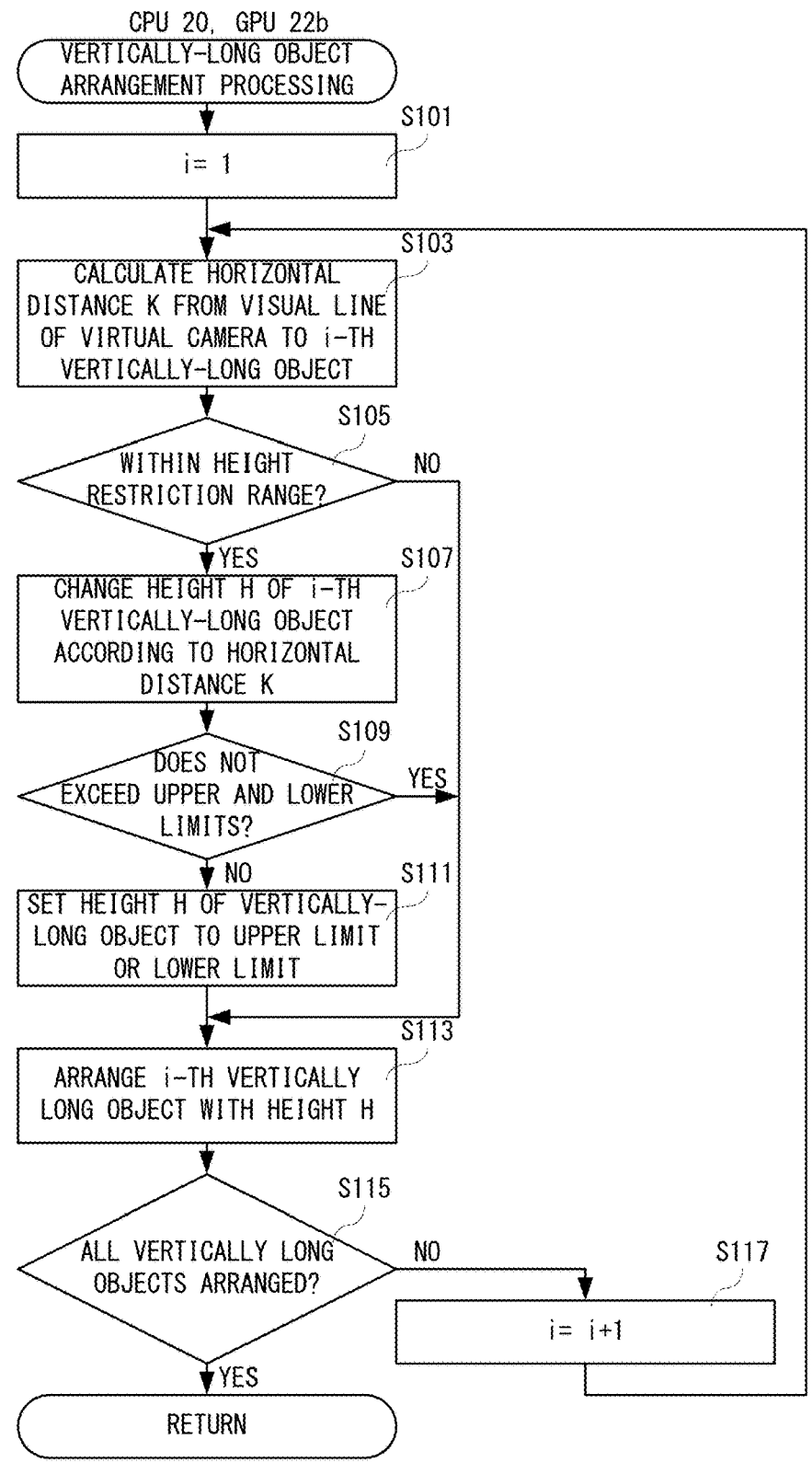
FIG. 19 is a flow chart showing a non-limiting example vertically-long object arrangement processing of the CPU and a GPU of the game apparatus shown in FIG. 2.

FIG. 19 is a flow chart of vertically-long object arranging processing performed in the processing of producing the game image for television in the step S7 shown in FIG. 18.

In addition, here, a case where a vertically-long object (grass object 106a) with comparatively high height is arranged when producing the scene 100 as shown in FIG. 8 will be described using the parameter set as shown in FIG. 7.

If the vertically-long object arranging processing is started, the CPU 20 initializes in a step S101 a variable i (i=1) as shown in FIG. 19. In addition, the variable i is a variable for individually identifying a plurality of vertical long objects (grass objects 106a).

In a subsequent step S103, the horizontal distance K from the virtual camera 110 to the i-th vertically-long object is calculated. In addition, the position (three-dimensional position) of the virtual camera 110 is acquired by referring to the virtual camera data 340. Similarly, the position (three-dimensional position) of each vertically-long object is acquired by referring to the vertically-long object data 338. Moreover, since the acquired three-dimensional position is a three-dimensional position in the world coordinate of the virtual space, after being converted into the local coordinate system on the basis of the position of the virtual camera 110, the line of sight of the virtual camera 110 and the horizontal distance K of a vertically-long object are calculated.

In a next step S105, it is determined whether the i-th vertically-long object is within the height control range (E1). Here, the CPU 20 determines whether the horizontal distance K is equal to or less than the distance L1/2 defining the range E1.

If "NO" is determined in the step S105, that is, if the i-th vertically-long object exists outside the height control range (E1), the process proceeds to a step S109. On the other hand, if "YES" is determined in the step S105, that is, if the i-th vertically-long object is within the height control range (E1), the height H of the i-th vertically-long object is changed according to the horizontal distance K in a step S107, and then, the process proceeds to the step S109. That is, in the step S107, by multiplying the default height H of the i-th vertically-long object by the parameter determined according to the horizontal distance K, the height H is changed.

In the step S109, it is determined whether the height H of the i-th vertically-long object is within the upper limit and the lower limit. At this time, the CPU 20 acquires the values of the upper limit and the lower limit by referring to the height limiting data 344. If "YES" is determined in the step S109, that is, if the height H of the i-th vertically-long object is within the upper limit and the lower limit, the process proceeds to a step S113. On the other hand, if "NO" is determined in the step S109, that is, the height H of the i-th vertically-long object exceeds the upper limit or the lower limit, the height H of the i-th vertically-long object is set to the upper limit or the lower limit in a step S111, and the process proceeds to the step S113. In addition, in the step S113, when the height H of the i-th vertically-long object changed in the step S107 exceeds the upper limit, the eight H is set to the upper limit. Moreover, in the step S113, when the height H of the i-th vertically-long object changed at the step S107 is less than the lower limit, the height H is set to the lower limit.

In the step S113, the GPU 22b arranges, under instruction by the CPU 20, the i-th vertically-long object into the virtual space with the height H. Then, it is determined whether all the vertically-long objects are arranged in the scene 100 concerned in a step S115. Here, the CPU 20 determines whether the variable i reaches a total number of the vertically-long objects to be arranged.

If "NO" is determined in the step S115, that is, if a vertically-long object not having been arranges exists, the variable i is incremented by 1 (one) (i=i+1) in a step S117, the process returns to the step S103 so as to arrange a next vertically-long object. On the other hand, if "YES" is determined in the step S115, that is, if all the vertically-long objects in the scene 100 concerned are arranged, the vertically-long object arranging processing is ended, and the process returns to the processing of producing the game image for television in the step S7.

In addition, although a case where the vertically-long object with comparatively high height (grass object 106a) is arranged using the parameter set as shown in FIG. 7 when producing the scene 100 as shown in FIG. 8 is described in FIG. 19, the parameter set as shown in FIG. 11 may be used. Otherwise, the height H1 based on the horizontal distance K and the height H2 based on the three-dimensional distance R are calculated by using the parameter shown in FIG. 7 and FIG. 13, and the height H is changed to a higher one of the height H1 and the height H2. Furthermore, when producing the scene 200 as shown in FIG. 15, a vertically-long object with comparatively low height is arranged with using the parameter set as shown in FIG. 16(B), and at this time, the height of the vertically-long object around the virtual camera 110 may be changed based on the three-dimensional distance R.

Moreover, at the time when the processing of producing the game image is performed, the vertically-long object arranging processing shown in FIG. 19 may be always performed, or by determining whether it is the scene 100 or the scene 200 that the vertically-long object is to be arranged, the vertically-long object arranging processing may be performed only when it is the scene 100 or the scene 200.

According to this embodiment, in the scene that a plurality of vertically-long objects are provided on the ground so that the vegetation grows gregariously, the height of the vertically-long object is changed so that the vertically-long object goes away from the virtual camera, and therefore, it is possible to avoid the inconvenience that the player object is hidden by the vertically-long object when producing the game image.

Moreover, according to this embodiment, a vertically-long object that the height is to be adjusted is the vertically-long object within the predetermined range on the basis of the position or/and direction of the line of sight of the virtual camera, and the height is changed so as to be proportional to the horizontal distance or the three-dimensional distance with the virtual camera or a square thereof. Therefore, for example, the game image that the vertically-long object existing between the player object and the virtual camera is pushed aside is produced. Therefore, the appearance of the game image is comparatively natural. That is, it is considered that the player hardly feels uncomfortable.

That is, according to this embodiment, it is possible to increase the visibility of the image while maintaining natural appearance.

In addition, this embodiment is applied to a case where the virtual camera follows the player object from behind is described, but it is also applicable to a case of a first person viewpoint that the virtual camera is provided at a position of a head of the player object. In such a case, the object to be followed (gazed at) by the virtual camera is a predetermined object other than the player object, or an object that the player designates, or an object including a gaze position that the player designates.

Moreover, although as an example of a program (an information processing program or an application program) executed in the game apparatus, the game program is described in this embodiment, it does not need to be limited to a game program. For example, it is applicable to a program performing processing that two or more objects are arranged in a virtual space, and an image that is imaged by a virtual camera so as to gaze at a predetermined object is displayed.

Furthermore, although a case where a grass object is arranged as an example of a vertically-long object is described in this embodiment, it does not need to be limited to this. For example, a scene that objects of buildings such as a high-rise building are arranged densely on the ground object is constructed, and when displaying an image that is imaged by a virtual camera in such a scene while the player object is included in a visual field of the virtual camera, the building object is handled as the vertically-long object, and the building object may be deformed or moved so as to go away from the virtual camera.

Furthermore, the structure of the game system shown in this embodiment is merely an example, and it does not need to be limited to this, and it is possible to adopt other structures. For example, it is also applicable to a portable game apparatus. Moreover, it is applicable to a desktop PC that is connected with a monitor, a notebook PC, a tablet PC or a smartphone, each having a game function.

In this embodiment, the image processing is performed on the game image for television, but the image processing may be performed on the game image to be displayed on the terminal device.

Furthermore, specific numerical values and game images shown in this embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An image processing apparatus, comprising:
a processing system, including a computer hardware processor, the processing system being configured to at least perform:
object control to control objects arranged in a virtual space;
virtual camera control to control a virtual camera that is movably arranged in the virtual space; and
image generation to produce an image of the virtual space based on the virtual camera, wherein
the object control further performs first object control processing that deforms or moves a plurality of first kind objects out of the objects arranged in the virtual space in accordance with a distance from the virtual camera so as to go away from the virtual camera; and
the first object control processing deforms or moves the plurality of the first kind objects so that when the distance of the first kind objects from the virtual camera increases, an inclination angle of the first kind objects decreases such that the height of the first kind objects increases.

2. The image processing apparatus according to claim 1, further comprises an operation receiver configured to receive an operation input by a user, wherein
the virtual camera control moves the virtual camera in the virtual space according to the operation input by the user.

3. The image processing apparatus according to claim 2, wherein the objects arranged in the virtual space further include a second kind object that is controlled according to the operation input by the user, and
the object control further performs second object control processing that controls a position of the second kind object in the virtual space according to the operation input by the user, and
the virtual camera control performs control that makes the virtual camera follow the second kind object so that the second kind object can enter into a field of view of the virtual camera.

4. The image processing apparatus according to claim 3, wherein the second kind object is a player object.

5. The image processing apparatus according to claim 1, wherein the object control performs deformation or movement in first object control processing so that the larger distance of the first kind object out of the plurality of the first kind objects to the virtual camera in the same direction, the smaller degree of the deformation or movement.

6. The image processing apparatus according to claim 1, wherein the objects arranged in the virtual space further includes a third kind object as a ground, and the first kind object is an object of a vertically-long shape arranged on the third kind object, and
the object control performs the deformation decreasing a length from an upper surface of the third kind object to an upper end of the first kind object, or a height from the upper surface of the third kind object to the upper end of the first kind object.

7. An image processing apparatus, comprising:
an operation receiver configured to receive an operation input by a user; and
a processing system, including a computer hardware processor, the processing system being configured to at least perform:
an object control to control objects arranged in a virtual space;
a virtual camera control to control a virtual camera that is movably arranged in the virtual space; and
an image production to produce an image of the virtual space based on the virtual camera, wherein
the objects arranged in the virtual space include a plurality of first kind objects and a second kind object that is controlled in accordance with the operation input by the user,
the object control determines, based on the virtual camera, whether at least a part of the second kind object is hindered by the first kind objects, and in a case of a hindering state, performs first object control processing that deforms or moves the first kind objects so that the first kind objects go away from the virtual camera, the first object control processing deforms or moves the plurality of the first kind objects so that when the distance of the first kind objects from the virtual camera increases, an inclination angle of the first kind objects decreases such that the height of the first kind objects increases.

8. The image processing apparatus according to claim 7, wherein the second kind object is a player object.

9. A non-transitory computer readable storage medium storing a game program that is executed by a computer, wherein the game program causes one or more processors provided in the computer to perform an object controlling step controlling objects arranged in a virtual space;

a virtual camera controlling step controlling a virtual camera that is movably arranged in the virtual space; and an image producing step producing an image of the virtual space based on the virtual camera, wherein:

the object controlling step performs first object control processing that deforms or moves a plurality of first kind objects out of the objects arranged in the virtual space in accordance with a distance from the virtual camera so as to go away from the virtual camera, and the first object control processing deforms or moves the plurality of the first kind objects so that when the distance of the first kind objects from the virtual camera increases, an inclination angle of the first kind objects decreases such that the height of the first kind objects increases.

10. The storage medium according to claim 9, wherein the game program further causes the one or more processors to perform an operation receiving step receiving an operation input by a user, and the virtual camera controlling step moves the virtual camera in the virtual space according to the operation input by the user.

11. The storage medium according to claim 10, wherein the objects arranged in the virtual space further include a second kind object that is controlled according to the operation input by the user, and the object controlling step includes a second object controlling processing that controls a position of the second kind object in the virtual space according to the operation input by the user, and the virtual camera controlling step performing control that makes the virtual camera follow the second kind object so that the second kind object can enter into a field of view of the virtual camera.

12. The storage medium according to claim 11, wherein the second kind object is a player object.

13. The storage medium according to claim 9, wherein the object controlling step performs deformation or movement in the first object control processing so that the larger distance of the first kind object out of the plurality of the first kind objects to the virtual camera in the same direction, the smaller degree of the deformation or movement.

14. The storage medium according to claim 9, wherein the objects arranged in the virtual space further includes a third kind object as a ground, and the first kind object is an object of a vertically-long shape arranged on the third kind object, and the object controlling step performs the deformation decreasing a length from an upper surface of the third kind object to an upper end of the first kind object, or a height from the upper surface of the third kind object to the upper end of the first kind object.

15. The storage medium according to claim 14, wherein the object controlling step performs the deformation changing the length or the height so as to be proportional to a distance from the virtual camera or a square of the distance.

16. The storage medium according to claim 15, wherein the object controlling step performs the deformation changing the length or the height between a lower limit and an upper limit.

17. The storage medium according to claim 15, wherein the distance is a horizontal distance in a horizontal direction perpendicular to a direction of a line of sight of the virtual camera.

18. The storage medium according to claim 15, wherein the distance is a three-dimensional distance from the virtual camera.

19. The storage medium according to claim 15, wherein the distance is a horizontal distance in a horizontal direction perpendicular to a direction of a line of sight of the virtual camera or a three-dimensional distance from the virtual camera, the object controlling step performs the first object control processing that deforms or moves, according to a predetermined rule, the plurality of first kind objects according to the horizontal distance or the three-dimensional distance so as to go away from the virtual camera.

20. A non-transitory computer readable storage medium storing a game program that is executed by a computer, wherein the game program causes one or more processors provided in the computer to perform an operation receiving step receiving an operation input by a user;

an object controlling step controlling objects arranged in a virtual space;

a virtual camera controlling step controlling a virtual camera that is movably arranged in the virtual space; and an image producing step producing an image of the virtual space based on the virtual camera, wherein the objects arranged in the virtual space include a plurality of first kind objects and a second kind object that is controlled in accordance with the operation input by the user, and the object controlling step determines, based on the virtual camera, whether at least a part of the second kind object is hindered by the first kind objects, and in a case of a hindering state, performs first object control processing that deforms or moves the first kind objects so that the first kind objects go away from the virtual camera, and the first object control processing deforms or moves the plurality of the first kind objects so that when the distance of the first kind objects from the virtual camera increases, an inclination angle of the first kind objects decreases such that the height of the first kind objects increases.

21. The storage medium according to claim 20, wherein the second kind object is a player object.

* * * * *